US011942713B2

(12) United States Patent
Hashimoto

(10) Patent No.: US 11,942,713 B2
(45) Date of Patent: Mar. 26, 2024

(54) SHIELDED CIRCUIT BOARD MOUNTED ELECTRICAL CONNECTOR FOR MATING WITH A SIGNAL TRANSMISSON MEDIUM

(71) Applicant: I-PEX Inc., Kyoto (JP)

(72) Inventor: Koji Hashimoto, Fukuoka (JP)

(73) Assignee: I-PEX Inc., Kyoto (JP)

( * ) Notice: Subject to any disclaimer, the term of this patent is extended or adjusted under 35 U.S.C. 154(b) by 266 days.

(21) Appl. No.: 17/323,097

(22) Filed: May 18, 2021

(65) Prior Publication Data

US 2021/0273362 A1 Sep. 2, 2021

Related U.S. Application Data

(63) Continuation of application No. PCT/JP2019/039720, filed on Oct. 8, 2019.

(30) Foreign Application Priority Data

Nov. 28, 2018 (JP) ................................ 2018-222796

(51) Int. Cl.
*H01R 12/79* (2011.01)
*H01R 12/73* (2011.01)
(Continued)

(52) U.S. Cl.
CPC .......... *H01R 12/79* (2013.01); *H01R 12/737* (2013.01); *H01R 12/775* (2013.01);
(Continued)

(58) Field of Classification Search
CPC .... H01R 12/79; H01R 12/737; H01R 12/775; H01R 13/6581; H01R 13/6594;
(Continued)

(56) References Cited

U.S. PATENT DOCUMENTS 5,478,259 A * 12/1995 Noschese ............ H01R 13/658 439/924.1
2017/0033510 A1* 2/2017 Ozeki ................. H01R 43/205

FOREIGN PATENT DOCUMENTS

JP 10-172685 A 6/1998
JP 2008-027707 A 2/2008
(Continued)

OTHER PUBLICATIONS

International Search Report dated Dec. 10, 2019 in PCT/JP2019/039720 filed on Oct. 8, 2019, 2 pages.

*Primary Examiner* — Abdullah A Riyami
*Assistant Examiner* — Justin M Kratt
(74) *Attorney, Agent, or Firm* — Oblon, McClelland, Maier & Neustadt, L.L.P.

(57) ABSTRACT

An electrical connector according to an embodiment includes a plurality of signal contacts with an electrically conductive property, a housing with an insulation property, and a shell with an electrically conductive property. The plurality of signal contacts are arrayed along a first direction of the electrical connector and are held by the housing. The shell covers each of a plurality of outer surfaces of the housing that exclude a surface that faces a principal surface of a wiring substrate, and faces a connection part(s) that is/are connected to the wiring substrate on an outer surface of the housing and the plurality of signal contacts, with a gap(s), in a second direction that is a direction along the principal surface of the wiring substrate and is orthogonal to the first direction.

5 Claims, 21 Drawing Sheets

(51) Int. Cl.

| | |
|---|---|
| ***H01R 12/77*** | (2011.01) |
| ***H01R 13/6581*** | (2011.01) |
| ***H01R 13/6594*** | (2011.01) |
| *H01R 12/70* | (2011.01) |
| *H01R 12/71* | (2011.01) |
| *H01R 12/72* | (2011.01) |
| *H01R 12/78* | (2011.01) |

(52) U.S. Cl.
CPC ..... *H01R 13/6581* (2013.01); *H01R 13/6594* (2013.01); *H01R 12/70* (2013.01); *H01R 12/7011* (2013.01); *H01R 12/7017* (2013.01); *H01R 12/7023* (2013.01); *H01R 12/707* (2013.01); *H01R 12/71* (2013.01); *H01R 12/712* (2013.01); *H01R 12/716* (2013.01); *H01R 12/727* (2013.01); *H01R 12/73* (2013.01); *H01R 12/735* (2013.01); *H01R 12/77* (2013.01); *H01R 12/78* (2013.01)

(58) Field of Classification Search
CPC ................ H01R 12/70; H01R 12/7011; H01R 12/7017; H01R 12/7023; H01R 12/707; H01R 12/71; H01R 12/712; H01R 12/716; H01R 12/727; H01R 12/73; H01R 12/735; H01R 12/77; H01R 12/78
See application file for complete search history.

(56) References Cited

FOREIGN PATENT DOCUMENTS

| | | | | |
|---|---|---|---|---|
| JP | 2008027707 | A | * | 2/2008 |
| JP | 2014-225412 | A | | 12/2014 |
| JP | 6179564 | B2 | | 8/2017 |
| JP | 2018-186056 | A | | 11/2018 |

* cited by examiner

SHIELDED CIRCUIT BOARD MOUNTED ELECTRICAL CONNECTOR FOR MATING WITH A SIGNAL TRANSMISSON MEDIUM

CROSS-REFERENCE TO RELATED APPLICATIONS

This application is a continuation of International Application No. PCT/JP2019/039720, filed on Oct. 8, 2019, which designates the United States and is incorporated by reference herein in its entirety, and which is based upon and claims the benefit of priority to Japanese Patent Applications No. 2018-222796, filed on Nov. 28, 2018, which is incorporated by reference herein in its entirety.

BACKGROUND OF THE INVENTION

1. Field of the Invention

A disclosed embodiment(s) relate(s) to an electrical connector.

2. Description of the Related Art

An electrical connector has conventionally been known that electrically connects a signal transmission medium with a plate shape such as a flexible printed circuit (FPC) or a flexible flat cable (FFC) to a wiring substrate. Such an electrical connector is used, for example, in a state where it is packaged on a principal surface of a wiring substrate by soldering or the like, and a signal transmission medium is inserted from an opening part that is provided on the electrical connector into an inside of the electrical connector. Thereby, a signal electrically conducting path of a signal transmission medium is electrically connected to a signal electrically conducting path of a wiring substrate through a signal contact of an electrical connector.

In an electronic instrument where such a kind of electrical connector is used, electromagnetic interference that is caused by radiation of an electromagnetic wave(s) may be problematic in association with a frequency increase of a transmission signal, an increase of an operation frequency, or the like. For example, by electromagnetic interference, it may be impossible for an electronic instrument to operate normally or an operation of the electromagnetic instrument may be destabilized. Hence, an electrical connector is developed that is capable of attaching a shell with an electrically conductive property to a housing where a signal contact is arranged, so as to cover an outer surface of the housing, and electrically connecting a ground electrically conducting path of a signal transmission medium to a ground electrically conducting path of a wiring substrate through such a shell.

For example, Japanese Patent Application Publication No. 2014-225412 discloses an electrical connector where a signal transmission medium is inserted into the electrical connector and subsequently an actuator that has a shield member is operated in such a manner that a housing where a signal contact is arranged is wholly covered by an electrically conductive member.

However, in an electrical connector as described in Japanese Patent Application Publication No. 2014-225412 as described above, a gap may be formed around a movable part of an actuator that has a shield member, so that an electromagnetic wave(s) may leak from such a gap. Hence, it may be impossible to execute electromagnetic shielding of a signal transmission path in an electrical connector well.

SUMMARY OF THE INVENTION

An electrical connector according to an aspect of an embodiment is an electrical connector that electrically connects a signal transmission medium with a plate shape and a wiring substrate, and includes a plurality of signal contacts with an electrically conductive property, a housing with an insulation property, and a shell with an electrically conductive property. The plurality of signal contacts are arrayed along a first direction of the electrical connector, and electrically connect a corresponding signal electrically conducting path(s) among a plurality of signal electrically conducting paths that are provided on the signal transmission medium to a corresponding signal electrically conducting path(s) among a plurality of signal electrically conducting paths that are provided on the wiring substrate, respectively. The housing holds the plurality of signal contacts. The shell has an opening part where the signal transmission medium is inserted thereto from a direction that intersects with a principal surface of the wiring substrate, and electrically connects a ground electrical conducting path that is provided on the signal transmission medium to a ground electrically conducting path that is provided on the wiring substrate. The shell covers each of a plurality of outer surfaces of the housing that exclude a surface that faces the principal surface of the wiring substrate, and faces a connection part(s) that is/are connected to the wiring substrate on an outer surface of the housing and the plurality of signal contacts, with a gap(s), in a second direction that is a direction along the principal surface of the wiring substrate and is orthogonal to the first direction.

BRIEF DESCRIPTION OF THE DRAWING(S)

DETAILED DESCRIPTION OF THE PREFERRED EMBODIMENT(S)

Figure 1:
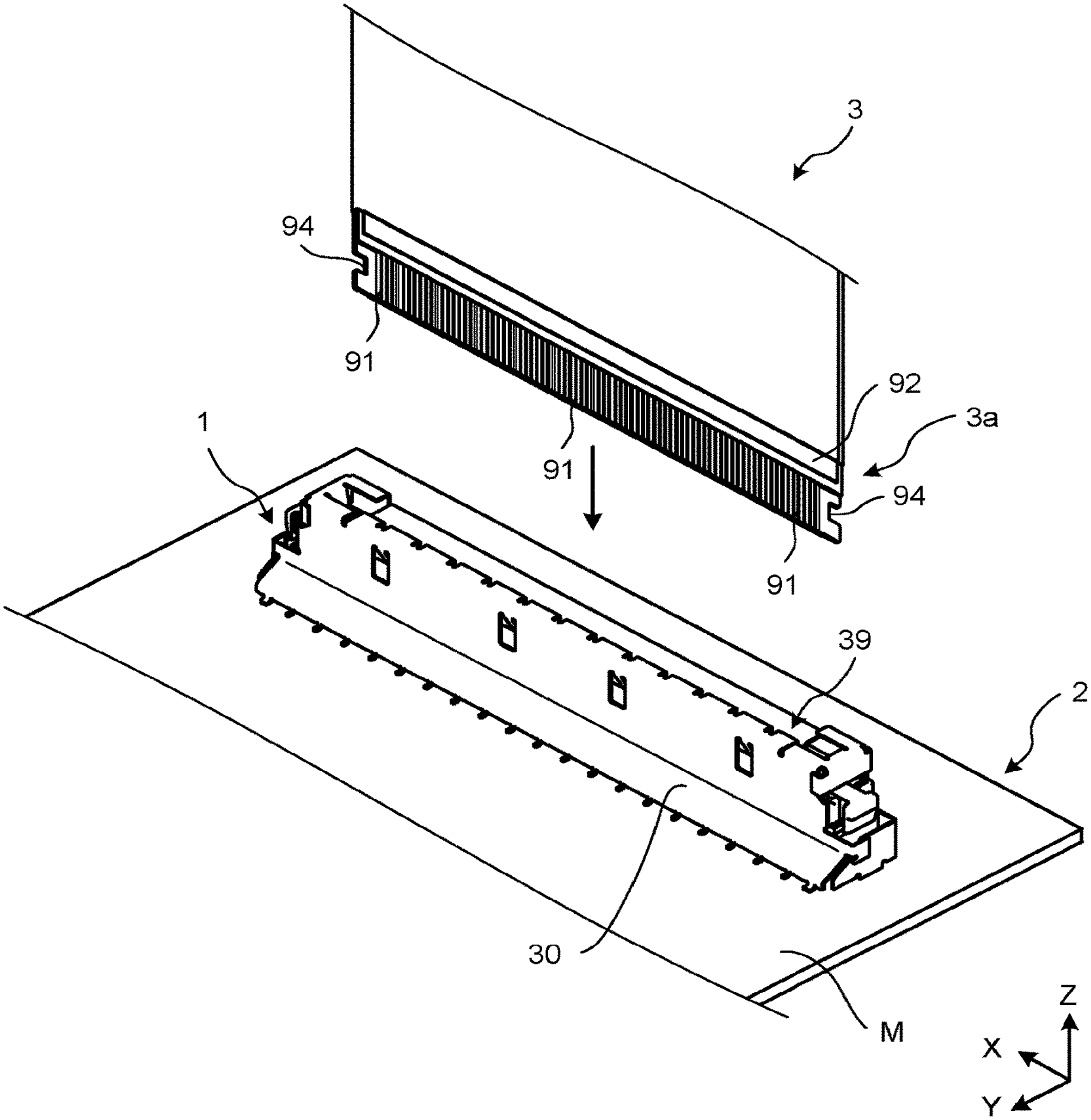
FIG. 1 is a diagram that illustrates an electrical connector, a wiring substrate, and a signal transmission medium according to an embodiment.

Hereinafter, an embodiment(s) of an electrical connector as disclosed in the present application will be explained in detail with reference to the accompanying drawings. Additionally, this invention is not limited by an embodiment(s) as illustrated below.

An aspect of an embodiment aims to provide an electrical connector that is capable of executing electromagnetic shielding of a signal transmission path well.

1. Outline of Electrical Connector

An outline of an electrical connector according to an embodiment will be explained with reference to FIG. 1 to FIG. 3. An electrical connector 1 according to an embodiment is packaged on a principal surface M of a wiring substrate 2 that is mounted on an electrical instrument or the like by soldering or the like as illustrated in FIG. 1 and FIG. 2, and electrically connects the wiring substrate 2 and a signal transmission medium 3.

The signal transmission medium 3 is a flat wiring member that is formed into a plate shape, and is, for example, a flexible printed circuit (FPC), a flexible flat cable (FFC), or the like. A plurality of signal electrically conducting paths 91 and a ground electrically conducting path 92 are provided on the signal transmission medium 3. Furthermore, cut parts 94 are formed on a tip part 3*a* of the signal transmission medium 3 at one end and another end thereof in an array direction of the plurality of signal electrically conducting paths 91.

Figure 3:
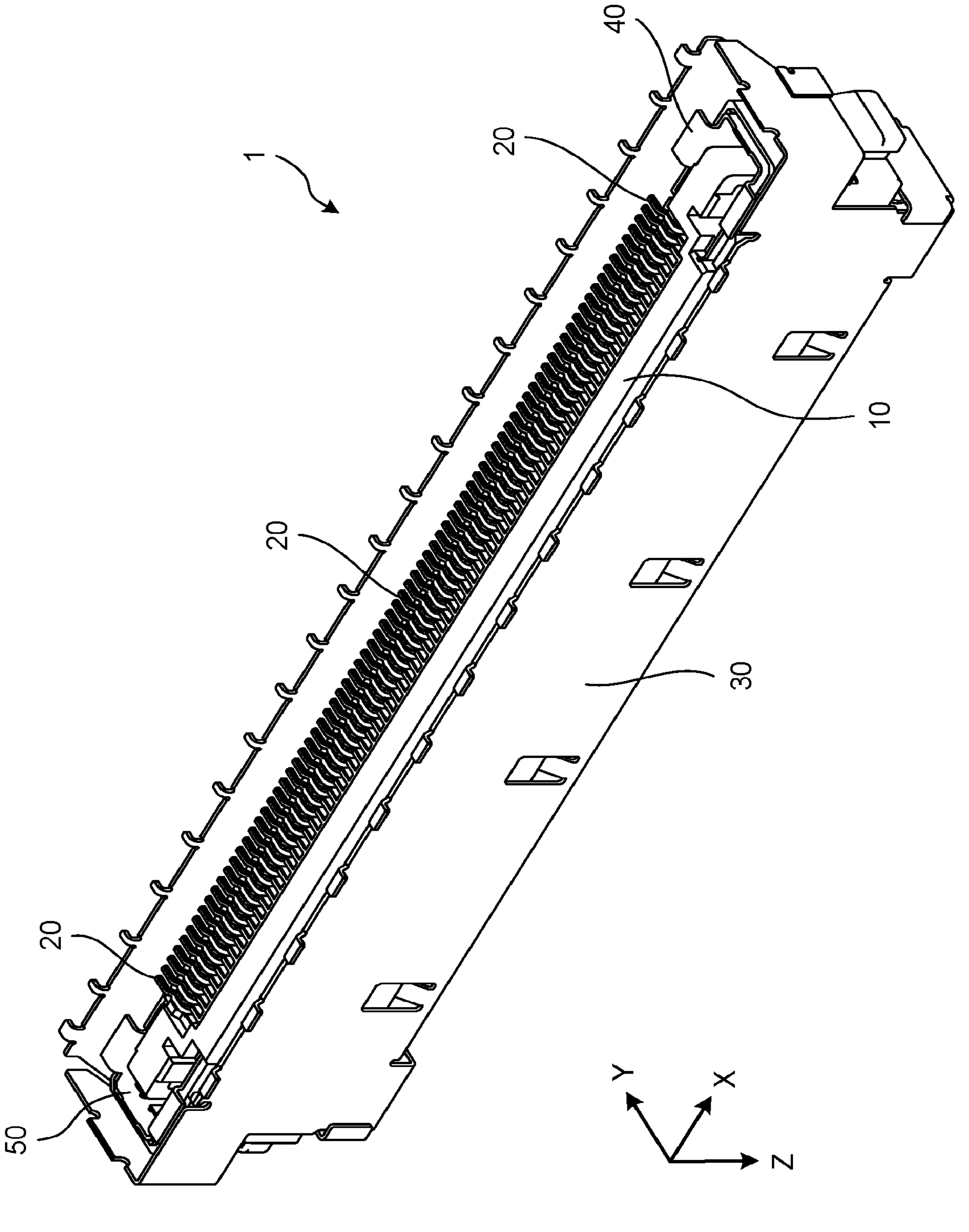
FIG. 3 is a perspective view of an electrical connector according to an embodiment.

As illustrated in FIG. 3, the electrical connector 1 includes a housing 10 with an insulation property, a plurality of signal contacts 20 with an electrically conductive property that are arrayed on the housing 10, a shell 30 with an electrically conductive property, and a pair of fixing brackets 40, 50. In a state as illustrated in FIG. 1, the plurality of signal contacts 20 are electrically connected to corresponding signal electrically conducting paths among a plurality of signal electrically conducting paths (non-illustrated) that are formed on the wiring substrate 2, respectively.

Figure 2:
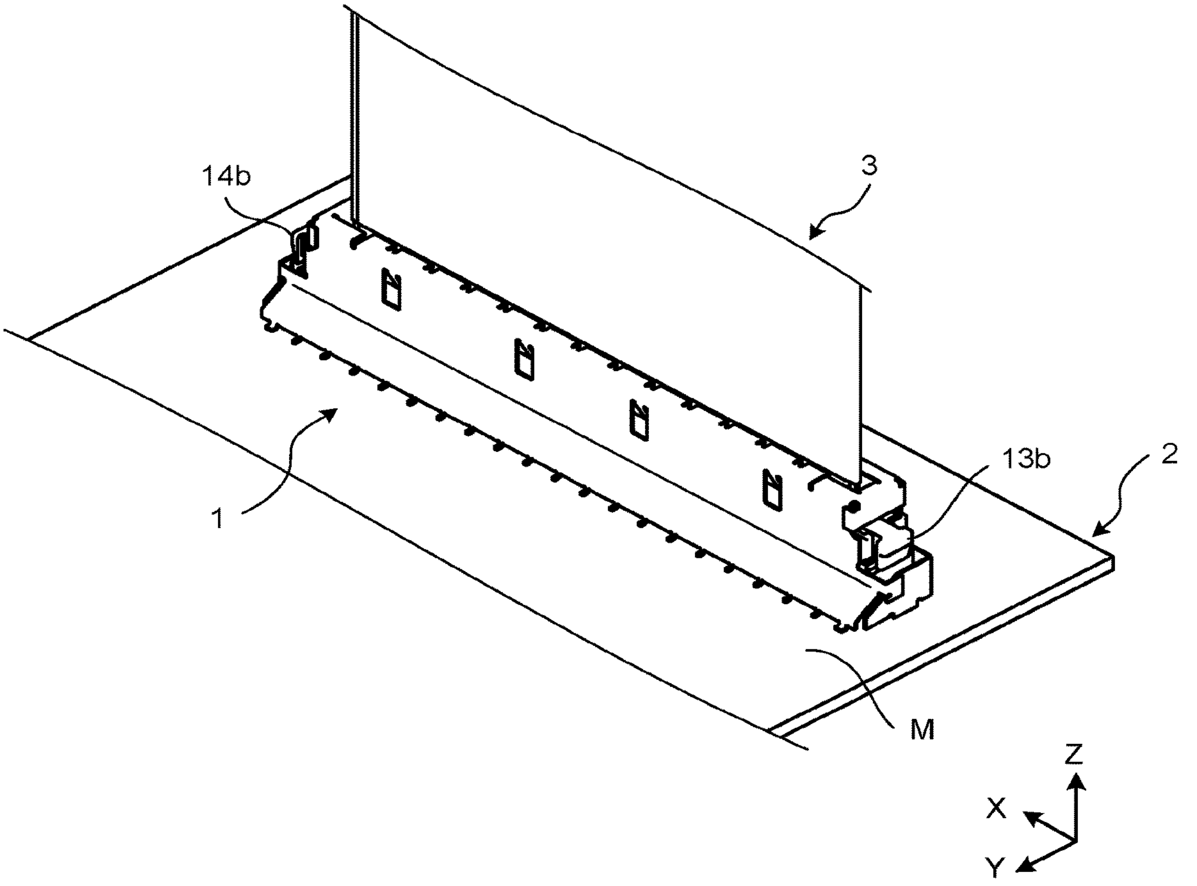
FIG. 2 is a diagram that illustrates a state where a signal transmission medium is connected to an electrical connector according to an embodiment.

As illustrated in FIG. 1, an opening part 39 where the signal transmission medium 3 is inserted thereto is formed on an upper part of the shell 30. As the tip part 3*a* of the signal transmission medium 3 is inserted into an inside of the electrical connector 1 through such an opening part 39, a state as illustrated in FIG. 2 is provided where the wiring substrate 2 and the signal transmission medium 3 are electrically connected by the electrical connector 1.

Specifically, the plurality of signal contacts 20 of the electrical connector 1 are provided in a state where a corresponding signal electrically conducting path(s) 91 among the plurality of signal electrically conducting paths 91 and a corresponding signal electrically conducting path(s) among a plurality of signal electrically conducting paths (not-illustrated) that are formed on the wiring substrate 2 are connected respectively. Furthermore, the shell 30 is provided in a state where the ground electrically conducting path 92 (see FIG. 1) and a ground electrically conducting path (not-illustrated) that is formed on the wiring substrate 2 are connected.

In a state as illustrated in FIG. 2, a pair of cut parts 94 (see FIG. 1) that is provided at a tip of the signal transmission medium 3 is locked by the fixing brackets 40, 50. Thereby, even in a case where an unintended force is exerted on the signal transmission medium 3, it is possible to prevent or reduce removing of the signal transmission medium 3 from the electrical connector 1.

Furthermore, a pair of operation parts 13*b*, 14*b* is provided on the housing 10 of the electrical connector 1. In a case where such a pair of operation parts 13*b*, 14*b* is operated so as to move to a direction toward the signal transmission medium 3 in a direction of an X-axis, locking between the fixing brackets 40, 50 and the cut parts 94 of the signal transmission medium 3 is released, so that it is possible to remove the signal transmission medium 3 from the electrical connector 1.

The shell 30 of the electrical connector 1 is attached to the housing 10 in a state where each of a plurality of outer surfaces of the housing 10 that exclude an outer surface that faces the wiring substrate 2 is covered thereby. Thereby, it is possible for the electrical connector 1 to execute electromagnetic shielding of a signal transmission path better than, for example, an electrical connector that includes an actuator that has a shield member.

2. Detail of Configuration of Electrical Connector 1

Next, a configuration of an electrical connector 1 will be explained specifically with reference to FIG. 4 to FIG. 16. Additionally, hereinafter, for convenience of explanation, array directions of a plurality of signal contacts 20 are provided as "leftward and rightward directions" (directions of an X-axis), a direction where a signal transmission medium 3 is inserted into the electrical connector 1 is provided as a "downward direction" (a negative direction of a Z-axis), a direction where the signal transmission medium 3 is removed from the electrical connector 1 is provided as an "upward direction" (a positive direction of a Z-axis), and directions (directions of an Y-axis) that are orthogonal to each of the "leftward and downward directions" and "upward and downward directions" are provided as "forward and backward directions".

The electrical connector 1 according to an embodiment includes a housing 10 where the plurality of signal contacts 20 are arrayed, a shell 30, and a pair of fixing brackets 40, 50, as described above. The plurality of signal contacts 20, the shell 30, and the fixing brackets 40, 50 are formed by, for example, applying punching and folding processes to a metal plate material.

Figure 4:
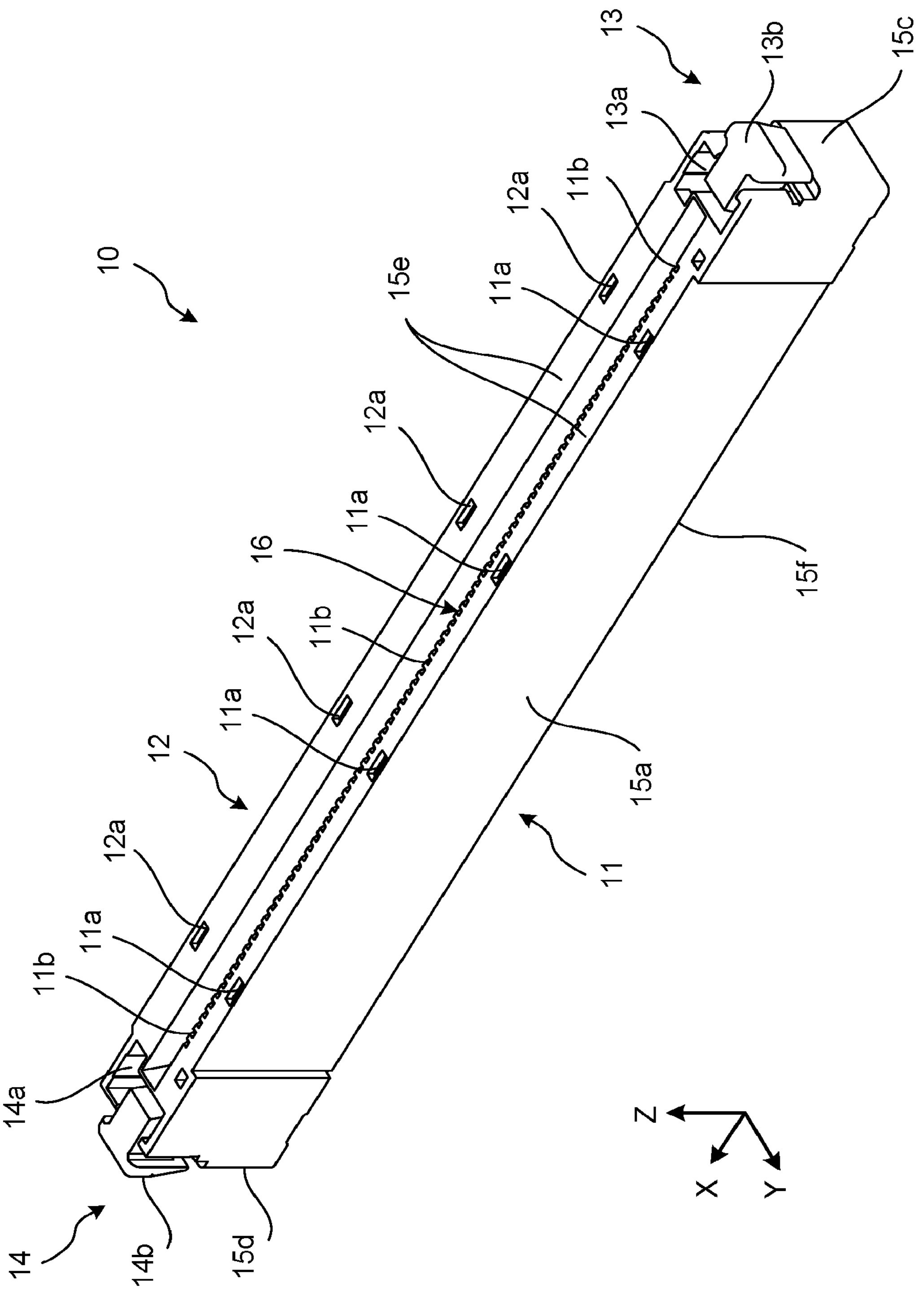
FIG. 4 is a perspective view of a housing according to an embodiment.
Figure 5:
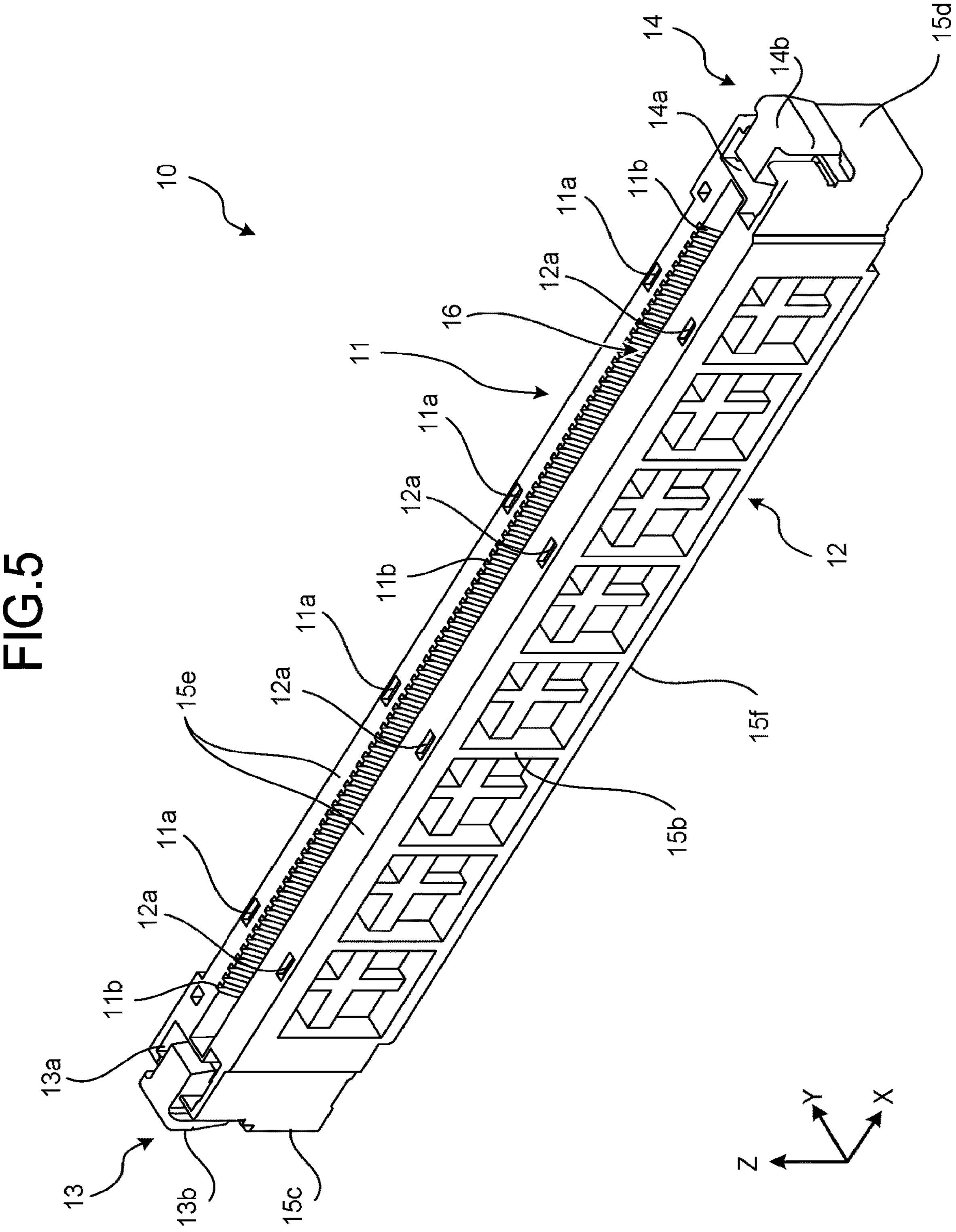
FIG. 5 is a perspective view of a housing according to an embodiment.

First, the housing 10 will be explained. As illustrated in FIG. 4 and FIG. 5, an opening part 16 that faces an opening part 39 (see FIG. 1) of the shell 30 in upward and downward directions where a tip part 3*a* (see FIG. 1) of the signal transmission medium 3 is inserted thereto is formed on an upper part of the housing 10. Additionally, in a case where the signal transmission medium 3 is inserted through the opening part 16, the plurality of signal contacts 20 that are held by the housing 10 are provided at positions that face a plurality of signal electrically conducting paths 91 that are formed on the tip part 3*a* of the signal transmission medium 3.

The housing 10 includes a front wall part 11 that extends in leftward and rightward directions, a back wall part 12 that is positioned behind the front wall part 11 and extends in leftward and rightward directions, a side wall part 13 that extends in frontward and backward directions and joins one end of the front wall part 11 and one end of the back wall part 12 in leftward and rightward directions, and a side wall part 14 that extends in frontward and backward directions and joins another end of the front wall part 11 and another end of the back wall part 12 in leftward and rightward directions. Additionally, the opening part 16 as described above is formed at a position that is surrounded by each of the front wall part 11, the back wall part 12, the side wall part 13, and the side wall part 14.

A plurality of groove parts 11*b* where the plurality of signal contacts 20 are press-fitted are formed on the front wall part 11. Furthermore, a plurality of recess parts 11*a* for fixing the shell 30 are formed on the front wall part 11 at an interval(s) in leftward and rightward directions. Similarly, a plurality of recess parts 12*a* for fixing the shell 30 are formed on the back wall part 12 at an interval(s) in leftward and rightward directions.

The side wall part 13 has a containment part 13*a* that contains a part of a fixing bracket 40, and an operation part 13*b* as described above. Similarly, the side wall part 14 has a containment part 14*a* that contains a part of a fixing bracket 50, and an operation part 14*b* as described above.

A plurality of outer surfaces 15*a*, 15*b*, 15*c*, 15*d*, 15*e* of the housing 10 that exclude an outer surface 15*f* that faces a wiring substrate 2 are covered by the shell 30. The outer surface 15*f* is a surface that includes a lower surface of the front wall part 11, a lower surface of the back wall part 12, a lower surface of the side wall part 13, and a lower surface of the side wall part 14.

The outer surface 15*a* is a front surface of the housing 10 and includes a front surface of the front wall part 11 and front surfaces of the side wall parts 13, 14. The outer surface 15*b* is a back surface of the housing 10 and includes a back surface of the back wall part 12 and back surfaces of the side wall parts 13, 14. The outer surface 15*c* is a side surface of the side wall part 13 and the outer surface 15*d* is a side surface of the side wall part 14. The outer surface 15*e* includes an upper surface of the front wall part 11, an upper surface of the back wall part 12, an upper surface of the side wall part 13, and an upper surface of the side wall part 14.

Figure 6:
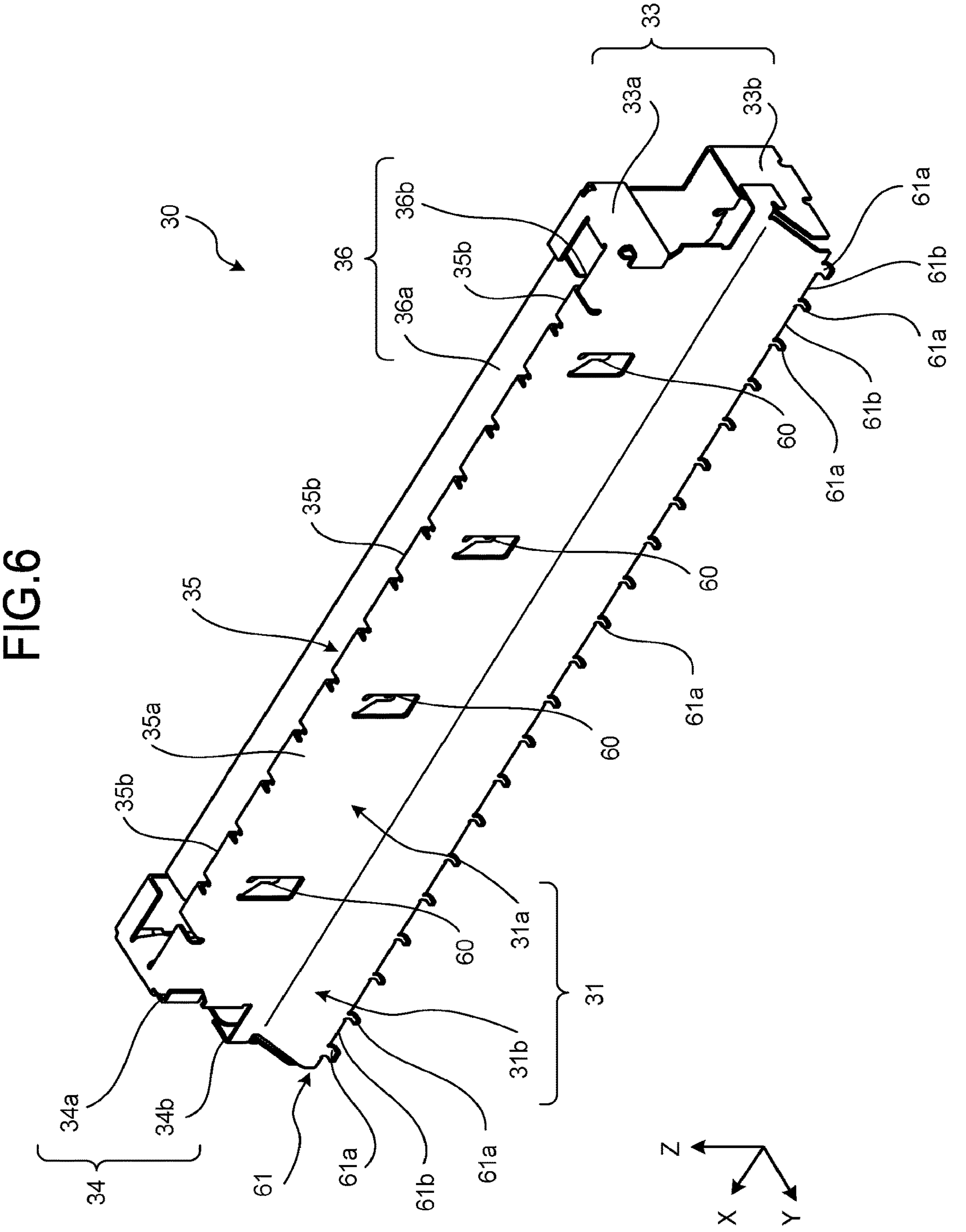
FIG. 6 is a perspective view of a shell according to an embodiment.
Figure 7:
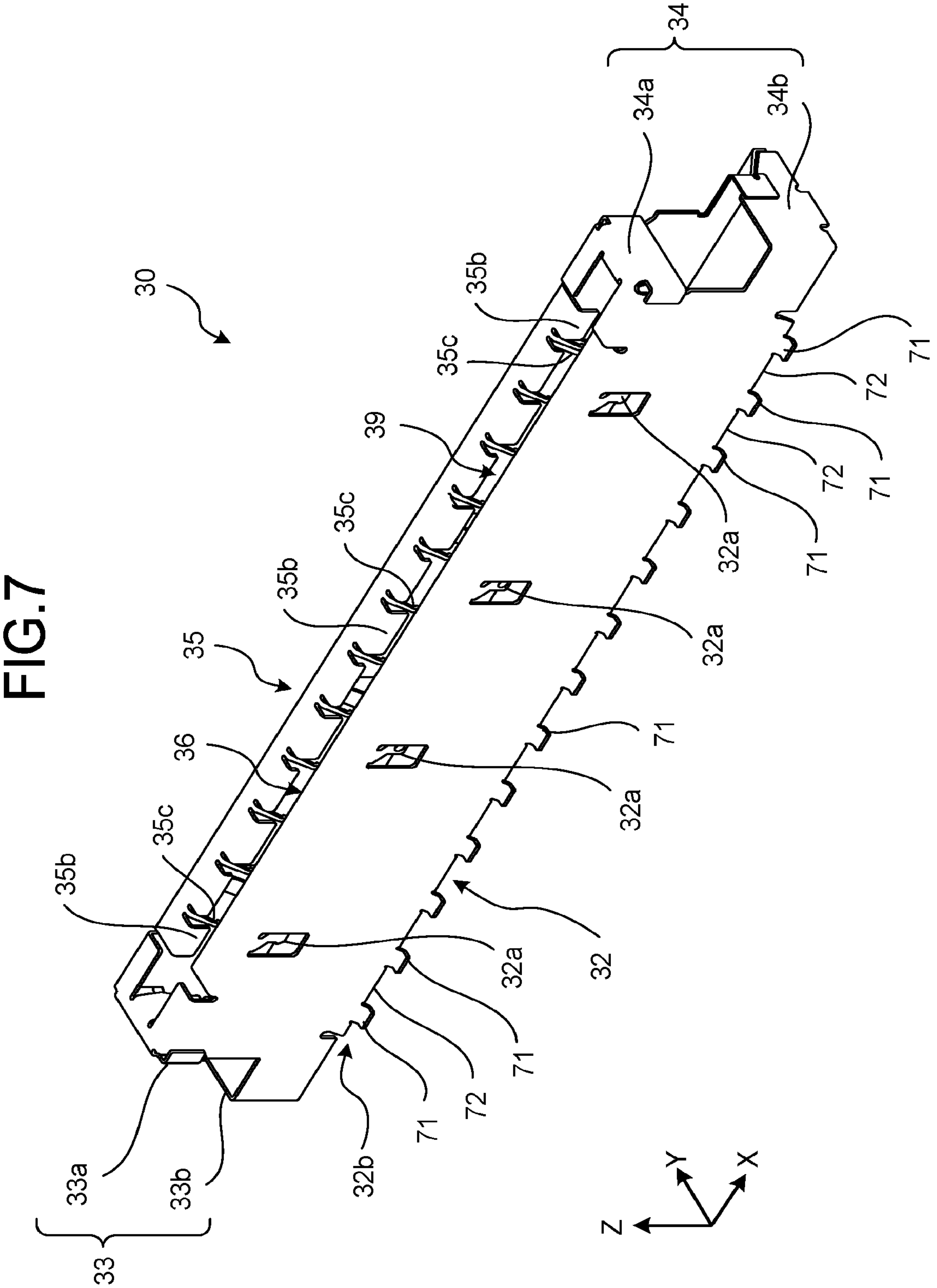
FIG. 7 is a perspective view of a shell according to an embodiment.

Next, the shell 30 will be explained. As illustrated in FIG. 6 and FIG. 7, the shell 30 includes a front cover part 31 that extends in leftward and rightward directions, a back cover part 32 that extends in leftward and rightward directions, a side cover part 33 that extends in frontward and backward directions and is formed between one end part of the front cover part 31 and one end part of the back cover part 32 in leftward and rightward directions, and a side cover part 34 that is formed between another end part of the front cover part 31 and another end part of the back cover part 32 in leftward and rightward directions.

Furthermore, the shell 30 includes a folding part 35 that is continuous with an upper end of the front cover part 31, and extends backward and subsequently is folded downward, and a folding part 36 that is continuous with an upper end of the back cover part 32, and extends frontward and subsequently is folded downward. The folding part 35 and the folding part 36 face through the opening part 39.

The front cover part 31 covers the outer surface 15*a* of the housing 10, the back cover part 32 covers the outer surface 15*b* of the housing 10, the side cover part 33 covers the outer surface 15*c*, and the side cover part 34 covers the outer surface 15*d*. Furthermore, the folding part 35 and the folding part 36 cover the outer surface 15*e*. Thus, the shell 30 covers the plurality of outer surfaces 15*a*, 15*b*, 15*c*, 15*d*, 15*e* of the housing 10 that exclude the outer surface 15*f*. Hence, it is possible for the shell 30 to execute electromagnetic shielding of a signal transmission path well.

Figure 11:
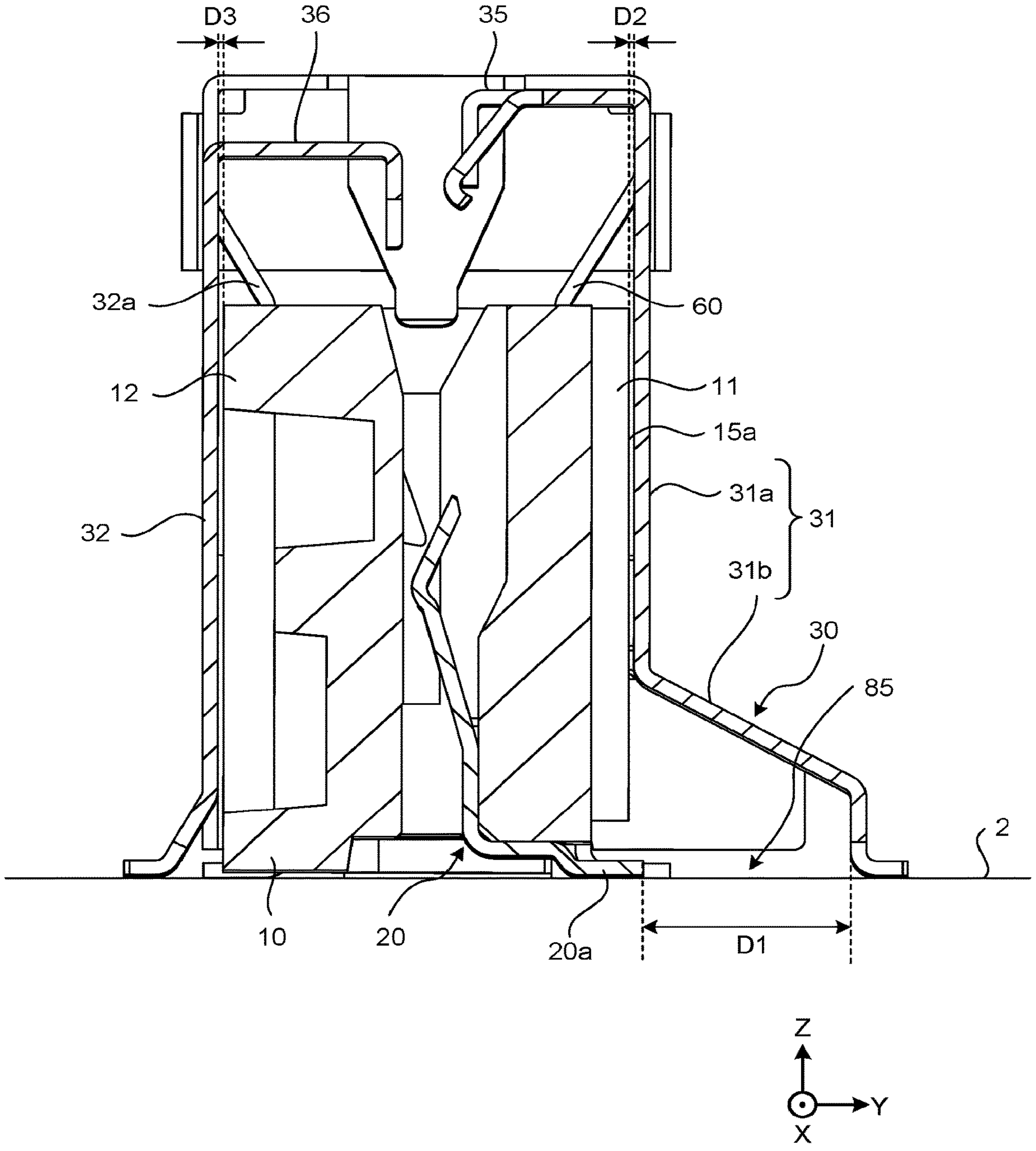
FIG. 11 is an arrow cross-sectional view along line XI-XI as illustrated in FIG. 10.
Figure 12:
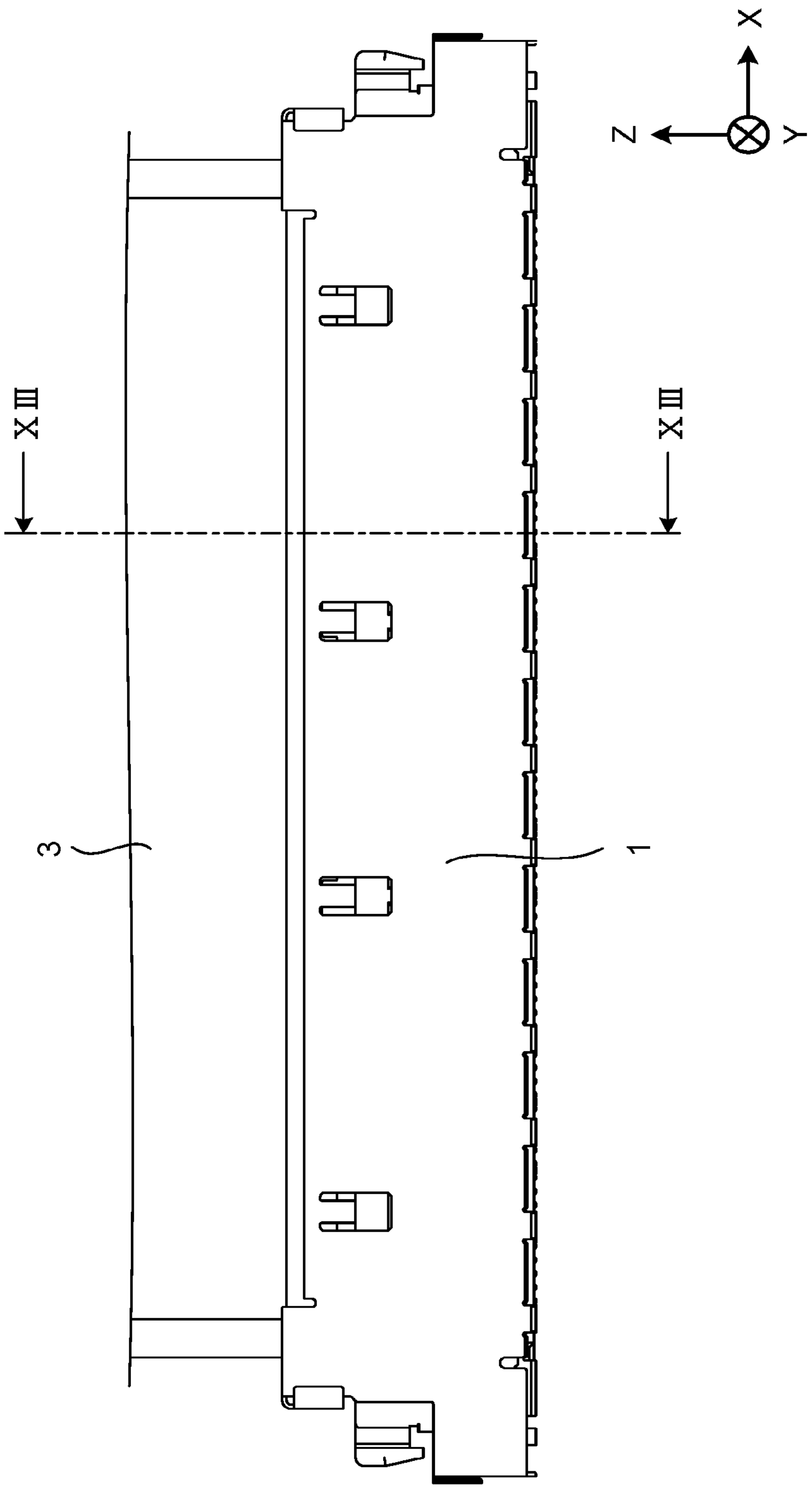
FIG. 12 is a back elevation view of an electrical connector in a state where a signal transmission medium according to an embodiment is connected thereto.

As illustrated in FIG. 6 and FIG. 11, the front cover part 31 has a principal surface part 31*a* that covers a part of the outer surface 15*a* of the housing 10 that extends in leftward and rightward directions and an extension-out part 31*b* that extends out from the principal surface part 31*a* frontward and obliquely downward. A plurality of fixation parts 60 that extend from an upper end part of the principal surface part 31*a* backward and obliquely downward in a cantilever shape and subsequently extend downward are formed thereon.

The plurality of fixation parts 60 are arranged at an interval(s) in leftward and rightward directions. Each fixation part 60 has elasticity and one end part thereof is fixed on the housing 10. Specifically, one end part of the fixation part 60 is inserted into a recess part 11*a* (see FIG. 5) that is formed on an upper end part of the front wall part 11, so that the front cover part 31 is fixed on the housing 10.

Furthermore, a ground connection part 61 is formed on a lower end part of the extension-out part 31*b*. Such a ground connection part 61 has a plurality of connection terminal parts 61*a* that are connected to a non-illustrated ground electrically conducting path that is formed on the wiring substrate 2 and a plurality of cut parts 61*b* that are arranged at an interval(s) in leftward and rightward directions. The connection terminal parts 61*a* and the cut parts 61*b* are alternately arranged in leftward and rightward directions. A length of a cut part 61*b* in leftward and rightward directions is set at, for example, an interval not to pass an electromagnetic wave(s) that has/have a frequency that is identical to a frequency of a signal that is propagated by a signal contact 20.

The back cover part 32 has a plurality of fixation parts 32*a* that extend from an upper end part thereof frontward and obliquely downward in a cantilever shape and subsequently extend downward. Such a plurality of fixation parts 32*a* are arranged at an interval(s) in leftward and rightward directions. Each fixation part 32*a* has elasticity and one end part thereof is fixed on the housing 10. Specifically, one end part of a fixation part 32*a* is inserted into a recess part 12*a* (see FIG. 5) that is formed on an upper end part of the back wall part 12, so that the back cover part 32 is fixed on the housing 10.

Furthermore, as illustrated in FIG. 7, a ground connection part 32*b* is formed on a lower end part of the back cover part 32. Such a ground connection part 32*b* has a plurality of connection terminal parts 71 that are connected to a non-illustrated ground electrically conducting path that is formed on the wiring substrate 2 and a plurality of cut parts 72 that are arranged at an interval(s) in leftward and rightward directions. The connection terminal parts 71 and the cut parts 72 are alternately arranged in leftward and rightward directions. A length of a cut part 72 in leftward and rightward directions is set at, for example, an interval not to pass an electromagnetic wave(s) that has/have a frequency that is identical to a frequency of a signal that is propagated by a signal contact 20.

As illustrated in FIG. 6, the side cover part 33 has a top cover part 33*a* and a bottom cover part 33*b*. The top cover part 33*a* joins a top of one end of the front cover part 31 and a top of one end of the back cover part 32 in leftward and rightward directions. The bottom cover part 33*b* is formed so as to extend in frontward and backward directions from a bottom of one end of the front cover part 31 and a bottom of one end of the back cover part 32 in leftward and rightward directions, and covers a bottom of the outer surface 15*c* of the housing 10.

As illustrated in FIG. 7, the side cover part 34 has a top cover part 34*a* and a bottom cover part 34*b*. The top cover part 34*a* joins a top of another end of the front cover part 31 and a top of another end of the back cover part 32 in leftward and rightward directions. The bottom cover part 34*b* is formed so as to extend in frontward and backward directions from a bottom of another end of the front cover part 31 and a bottom of another end of the back cover part 32 in leftward and rightward directions, and covers a bottom of the outer surface 15*d* of the housing 10.

Figure 13:
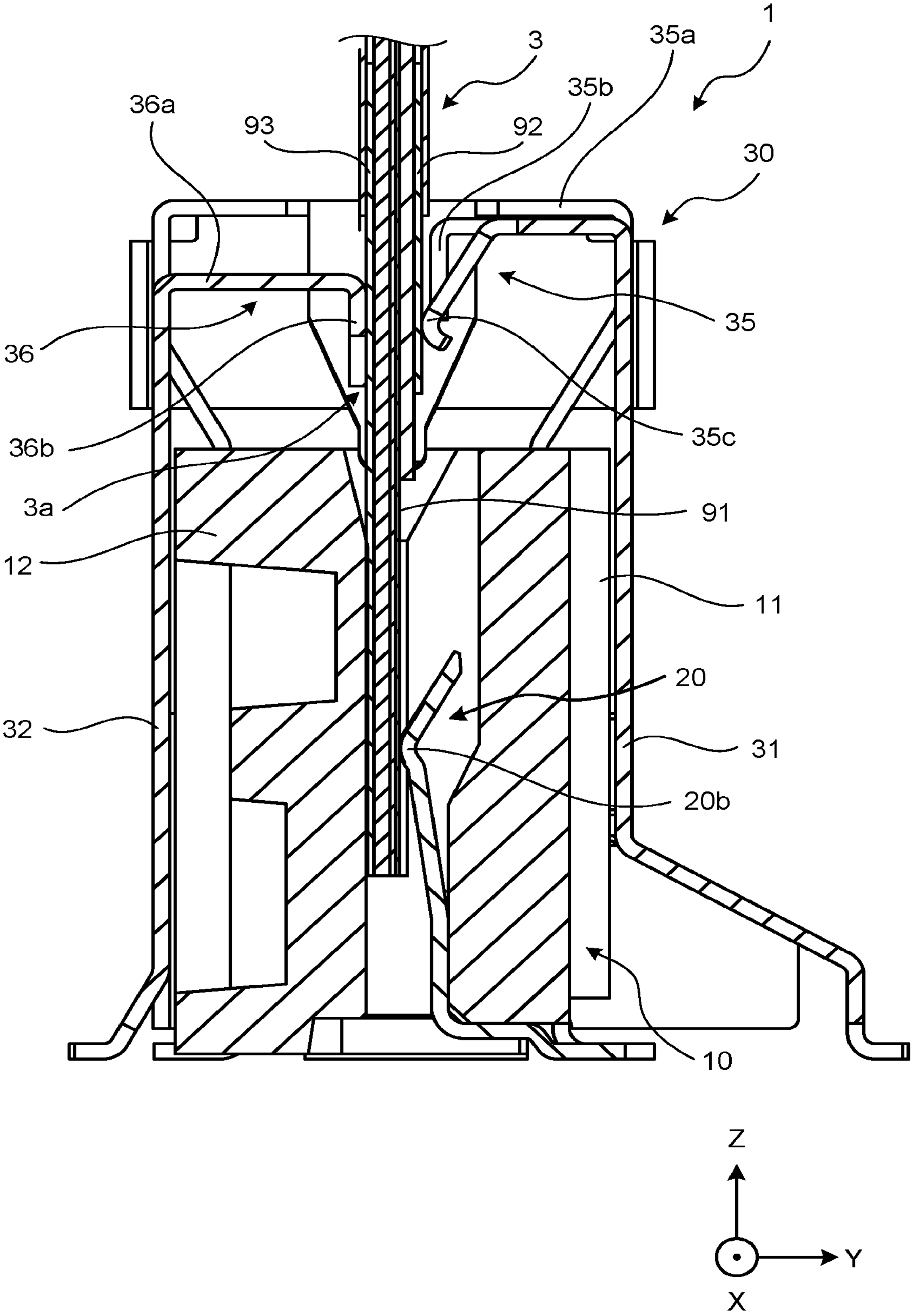
FIG. 13 is an arrow cross-sectional view along XIII-XIII as illustrated in FIG. 12.

As illustrated in FIG. 7 and FIG. 13, the folding part 35 has a base part 35*a* that is provided with one end that is continuous with an upper end of the front cover part 31 and extends backward, a plurality of drooping parts 35*b* that are continuous with another end of the base part 35*a* and extend downward, and a plurality of contact parts 35*c* that are respectively arranged between adjacent drooping parts 35*b* in mutually different combinations and extend backward and obliquely downward. The plurality of drooping parts 35*b* are arranged at an interval(s) in leftward and rightward directions. Similarly, the plurality of contact parts 35*c* are arranged at an interval(s) in leftward and rightward directions. The folding part 36 has a base part 36*a* that is provided with one end that is continuous with an upper end of the back cover part 32 and extends forward, and a contact part 36*b* that is continuous with another end of the base part 36*a* and extends downward.

Figure 8:
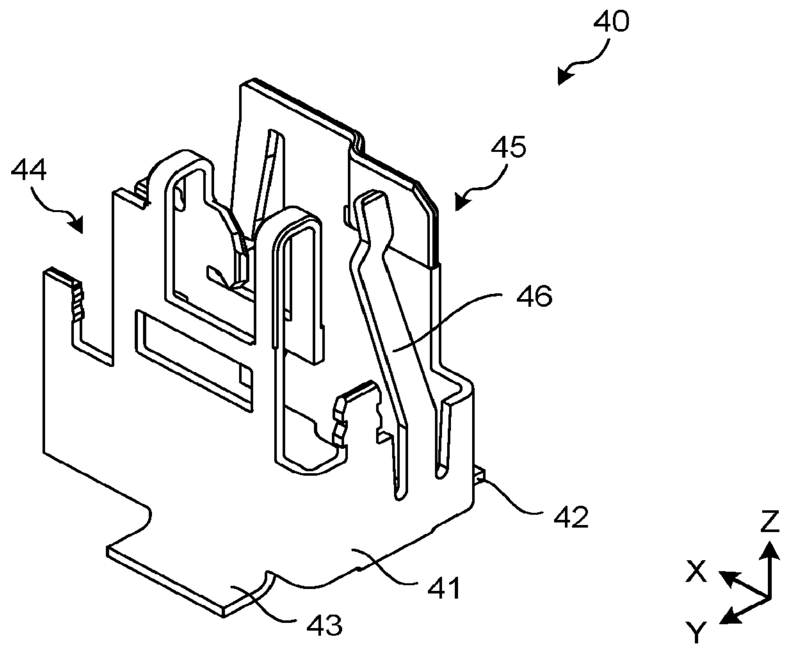
FIG. 8 is a perspective view of a fixing bracket according to an embodiment.
Figure 9:
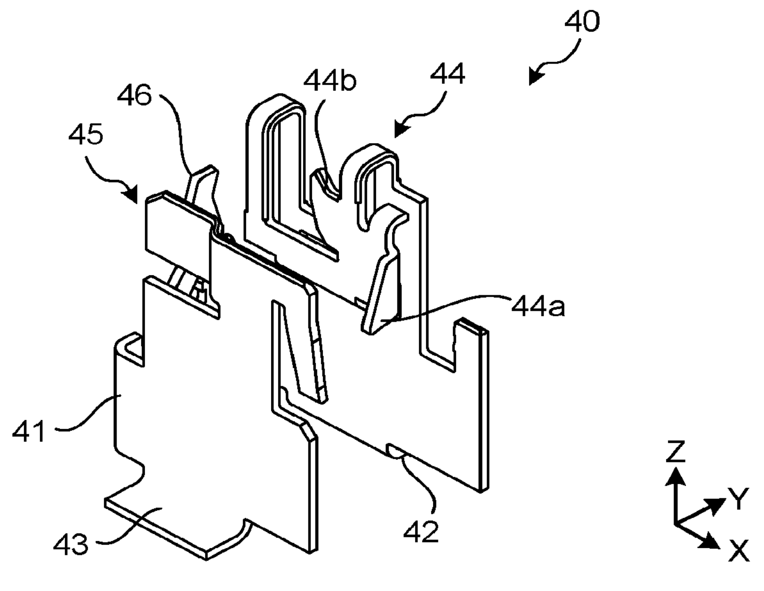
FIG. 9 is a perspective view of a fixing bracket according to an embodiment.
Figure 10:
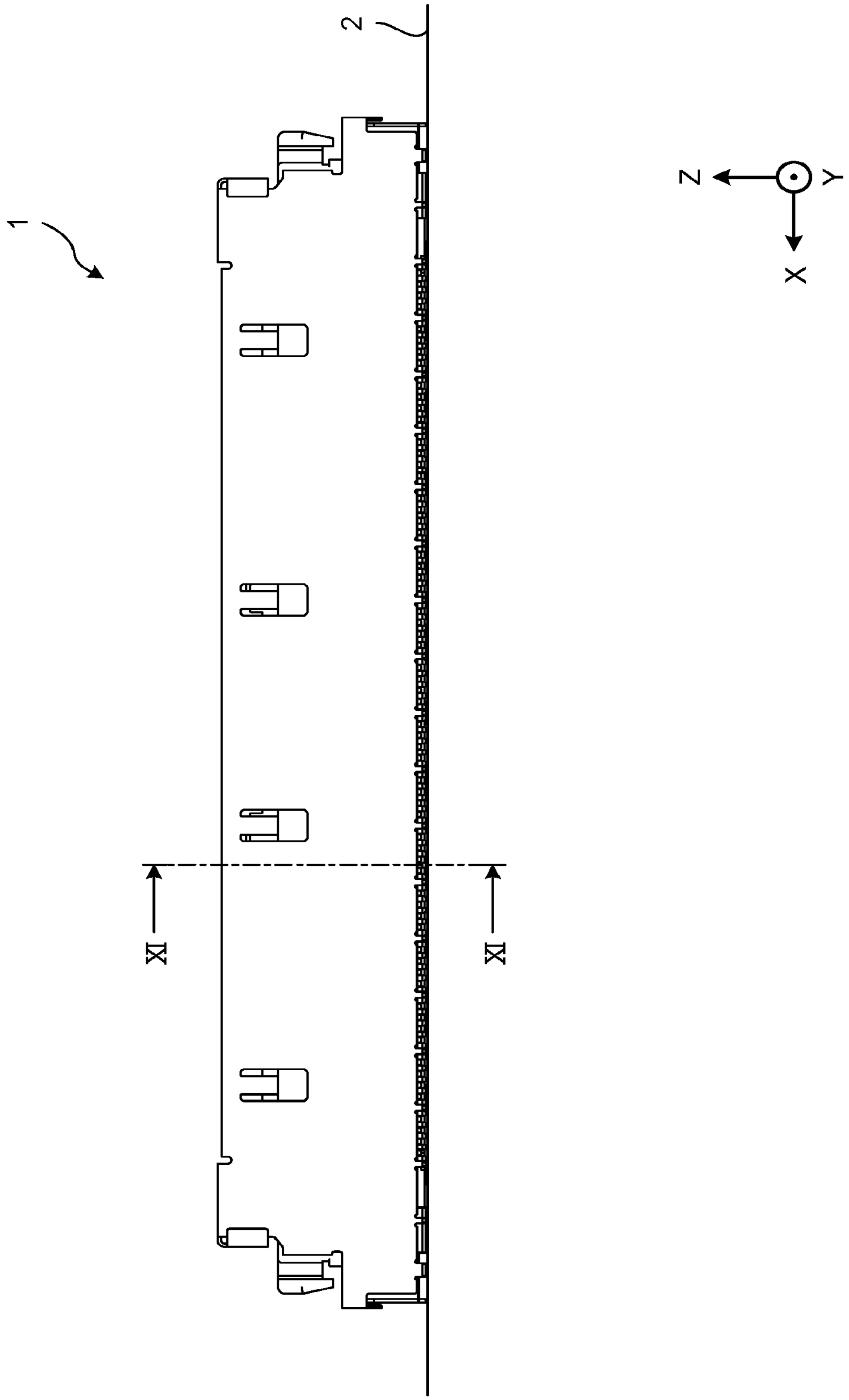
FIG. 10 is a front elevation view of an electrical connector in a state where it is packaged on a wiring substrate according to an embodiment.

Next, the fixing brackets 40, 50 will be explained. As illustrated in FIG. 8 and FIG. 9, a fixing bracket 40 has a base part 41 that is formed into a U-shape in a plan view thereof, and ground connection parts 42, 43 that extend frontward and backward respectively from a lower end of the base part 41 and are connected to a non-illustrated ground electrically conducing path that is formed on the wiring substrate 2.

Furthermore, the fixing bracket 40 has a folding part 44 with a proximal end that is continuous with an upper end of the base part 41, a fixation part 45 that faces the folding part 44 in frontward and backward directions and is fixed on the housing 10, and an extension part 46 that is continuous with an upper end of the base part 41 and extends upward.

A locking part 44*a* with a protrusion shape that protrudes toward the fixation part 45 is formed on a tip part of the folding part 44. In a case where the signal transmission medium 3 is connected to the electrical connector 1, such a locking part 44*a* is inserted into a cut part 94 of the signal transmission medium 3 and has a function to lock a state of connection between the electrical connector 1 and the signal transmission medium 3.

Furthermore, a protrusion part 44*b* that is inclined and protrudes in a direction away from the fixation part 45 is formed on a middle part of the folding part 44. In a case where such a protrusion part 44*b* is pushed by the operation part 13*b*, a tip part of the folding part 44 moves to a direction away from the fixation part 45. Thereby, the locking part 44*a* is removed from the cut part 94, so that a state of locking between the electrical connector 1 and the signal transmission medium 3 is released.

The extension part 46 has elasticity in leftward and rightward directions and is inserted into an attachment hole of the operation part 13*b*. Thereby, after the operation part 13*b* is operated by an operator in a direction where the protrusion part 44*b* is pushed, it is possible to return the operation part 13*b* to a non-operation position thereof.

The fixing bracket 50 has a shape that is mutually reflection-symmetric with the fixing bracket 40 (or plane-symmetric in a ZY-plane). Such a fixing bracket 50 has a folding part 54, a fixation part 55, and an extension part 56 that correspond to the folding part 44, the fixation part 45, and the extension part 46 of the fixing bracket 40, as described later.

Next, a relationship among the housing 10, the signal contact(s) 20, and the shell 30 will be explained. As illustrated in FIG. 11, the outer surface 15*a* of the housing 10 is covered by the front cover part 31. The front cover part 31 has the extension-out part 31*b* that extends out in a frontward direction that is a direction away from the outer surface 15*a*, from the principal surface part 31*a* that covers a part of the outer surface 15*a*, and is inclined downward.

Hence, as illustrated in FIG. 11, the shell 30 faces a connection part(s) 20*a* that is/are connected to a non-illustrated signal electrically conducting path that is formed on the wiring substrate 2, on the signal contact(s) 20, with a gap(s) 85 with a distance D1. Thereby, it is possible to execute wiring in a region of the wiring substrate 2 that faces the gap(s) 85, that is, a region with a range as indicated by a distance D1. Furthermore, it is possible for the shell 30 to shield an electromagnetic wave(s) that is/are generated by a signal that flows through a wiring that is formed in a region with a range as indicated by a distance D1. Therefore, it is possible to execute electromagnetic shielding of a signal transmission path well.

Furthermore, as illustrated in FIG. 11, the front wall part 11 and the back wall part 12 in the housing 10 are arranged at intervals from the principal surface part 31*a* of the front cover part 31 of the shell 30. Specifically, the front wall part 11 faces the principal surface part 31*a* through a gap with a distance D2 and the back wall part 12 faces the back cover part 32 through a gap with a distance D3. Then, an upper end part of the front wall part 11 is supported on the front wall part 11 by the fixation part 60 that has elasticity and an upper end part of the back wall part 12 is supported on the back wall part 12 by the fixation part 32*a* that has elasticity. Hence, an upper end part of the front wall part 11 and an upper end part of the back wall part 12 are capable of moving in frontward and backward directions.

As illustrated in FIG. 13, in a state where the signal transmission medium 3 is connected to the electrical connector 1, the tip part 3*a* of the signal transmission medium 3 is interposed between a contact part 36*b* of the folding part 36 of the shell 30 and a contact part(s) 35*c* of the folding part 35 of the shell 30. In a state as illustrated in FIG. 13, a ground electrically conducting path 92 of the signal transmission medium 3 contacts the contact part(s) 35*c* of the folding part 35 of the shell 30 and a ground electrically conducting path 93 of the signal transmission medium 3 contacts the contact part 36*b* of the folding part 36. Furthermore, in a state as illustrated in FIG. 13, a signal electrically conducting path(s) 91 of the signal transmission medium 3 contact(s) a contact part(s) 20*b* of the signal contact(s) 20.

Figure 14:
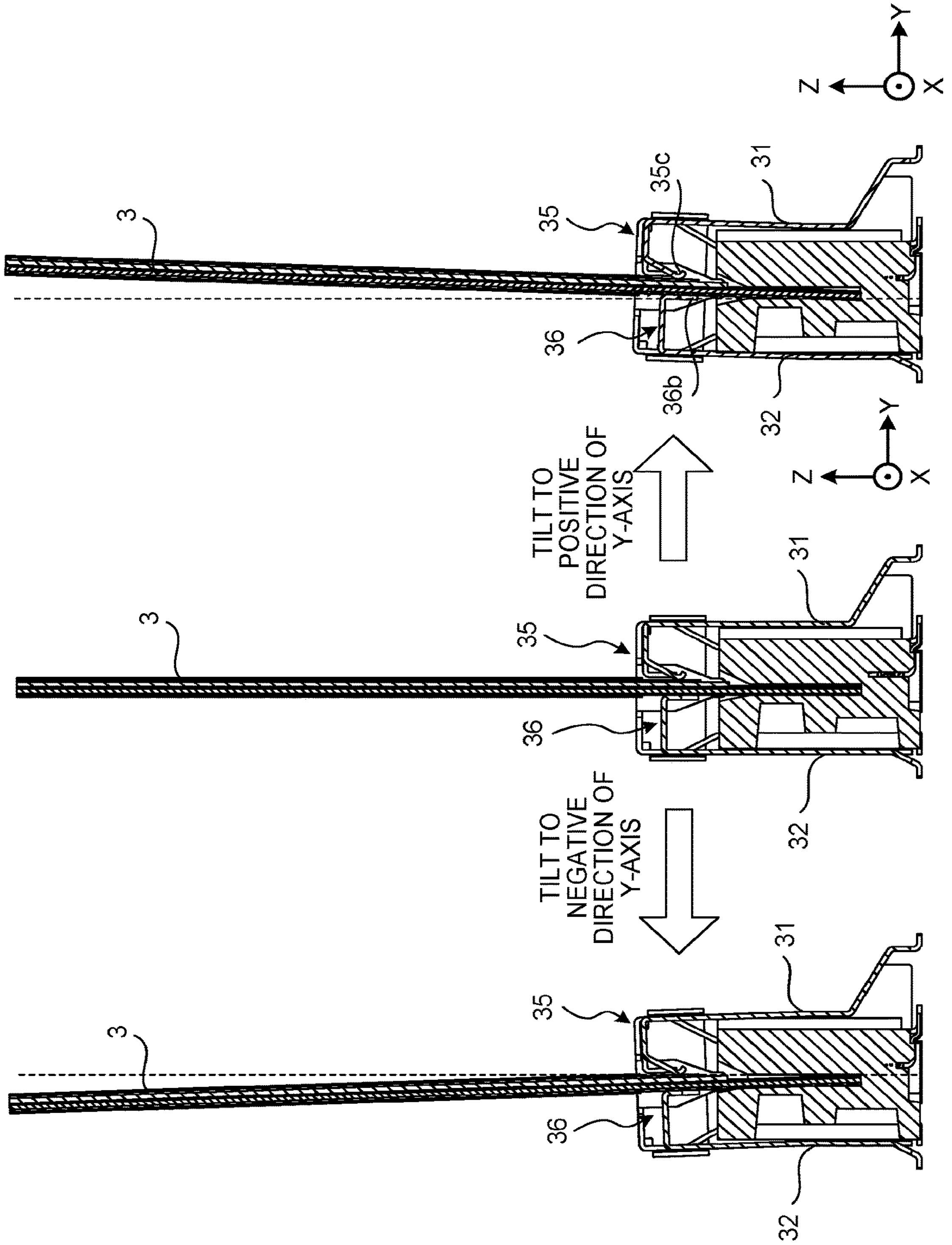
FIG. 14 is a diagram for explaining a state where a signal transmission medium in a state where an electrical connector according to an embodiment is connected thereto is tilted.

As the signal transmission medium 3 is tilted in one direction among frontward and backward directions (a positive direction of a Y-axis) as illustrated in FIG. 14 from a state as illustrated in FIG. 13, an upper end part of the front wall part 11 and an upper end part of the back wall part 12 are moved in one direction (a positive direction of a Y-axis) by the fixation part 60 and the fixation part 32*a* that have elasticity, so that the folding parts 35, 36 are moved in one direction (a positive direction of a Y-axis). Furthermore, as the signal transmission medium 3 is tilted in another direction among frontward and backward directions (a negative direction of a Y-axis) as illustrated in FIG. 14 from a state as illustrated in FIG. 13, an upper end part of the front wall part 11 and an upper end part of the back wall part 12 are moved in another direction (a negative direction of a Y-axis) by the fixation part 60 and the fixation part 32*a* that have elasticity, so that the folding parts 35, 36 are moved in another direction (a negative direction of a Y-axis).

Hence, even in a case where the signal transmission medium 3 that is connected to the electrical connector 1 is tilted, contact between the contact part(s) 35*c* of the folding part 35 and the ground electrically conducting path 92 is maintained and contact between the contact part 36*b* of the folding part 36 and the ground electrically conducting path 93 is maintained. Thereby, it is possible to stabilize a state of contact of the shell 30 with the ground electrically conducting paths 92, 93.

Figure 15:
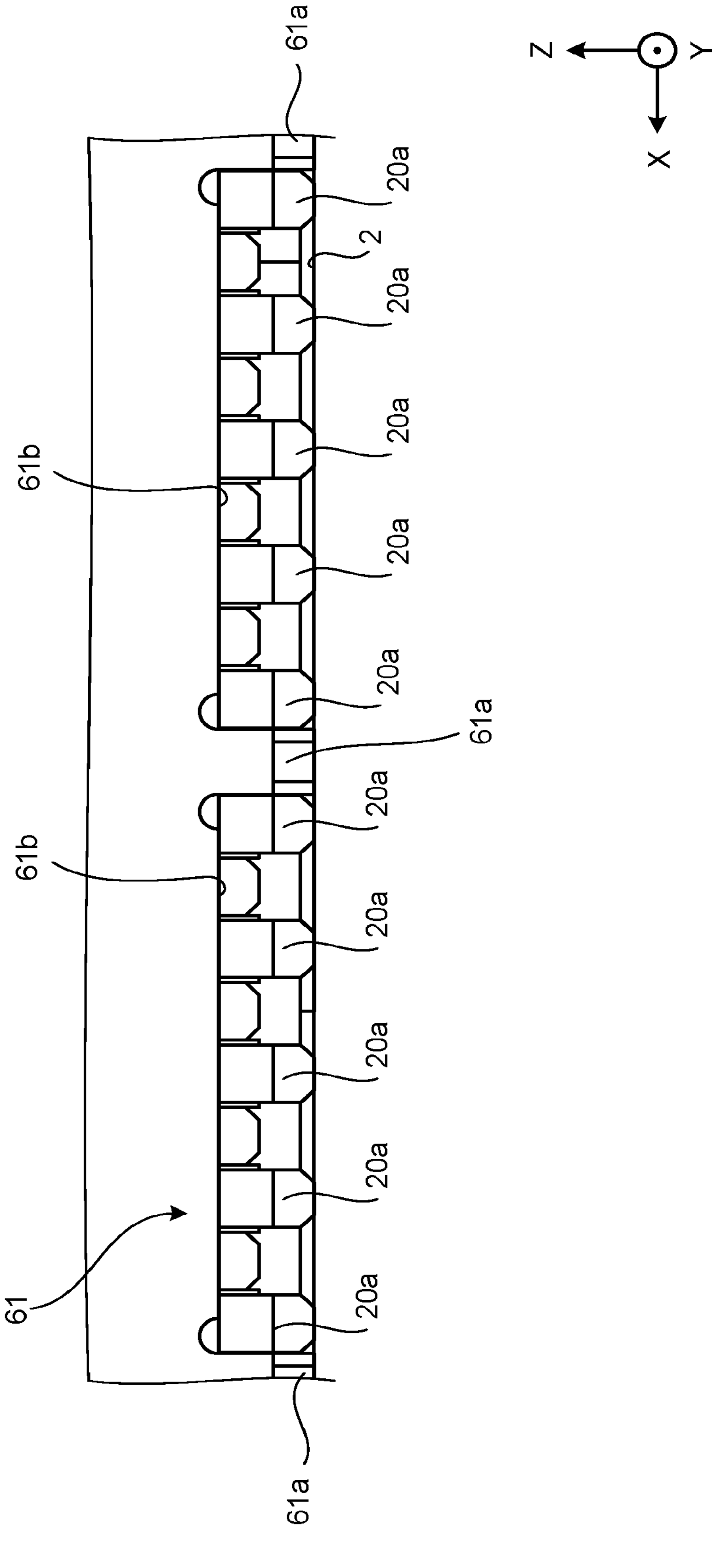
FIG. 15 is a partially enlarged view of FIG. 10.

Furthermore, the plurality of cut parts 61*b* (see FIG. 6) are formed on the ground connection part 61 of the shell 30. Hence, as illustrated in FIG. 15, connection parts 20*a* of the plurality of signal contacts 20 are exposed through the plurality of cut parts 61*b* in frontward and backward directions. Hence, after the electrical connector 1 is attached to the wiring substrate 2, it is possible to readily confirm connection between a non-illustrated ground electrically conducting path that is formed on the wiring substrate 2 and a connection part(s) 20*a*.

Additionally, for connection between a ground electrically conducting path of the wiring substrate 2 and the connection part(s) 20*a* of the signal contact(s) 20, it is possible to determine connection between the ground electrically conducting path of the wiring substrate 2 and the connection part(s) 20*a* of the signal contact(s) 20 automatically by, for example, capturing an image of the electrical connector 1 from a position that faces the front cover part 31 of the shell 30 in frontward and backward directions and image-analyzing such a result of image capturing.

Figure 16:
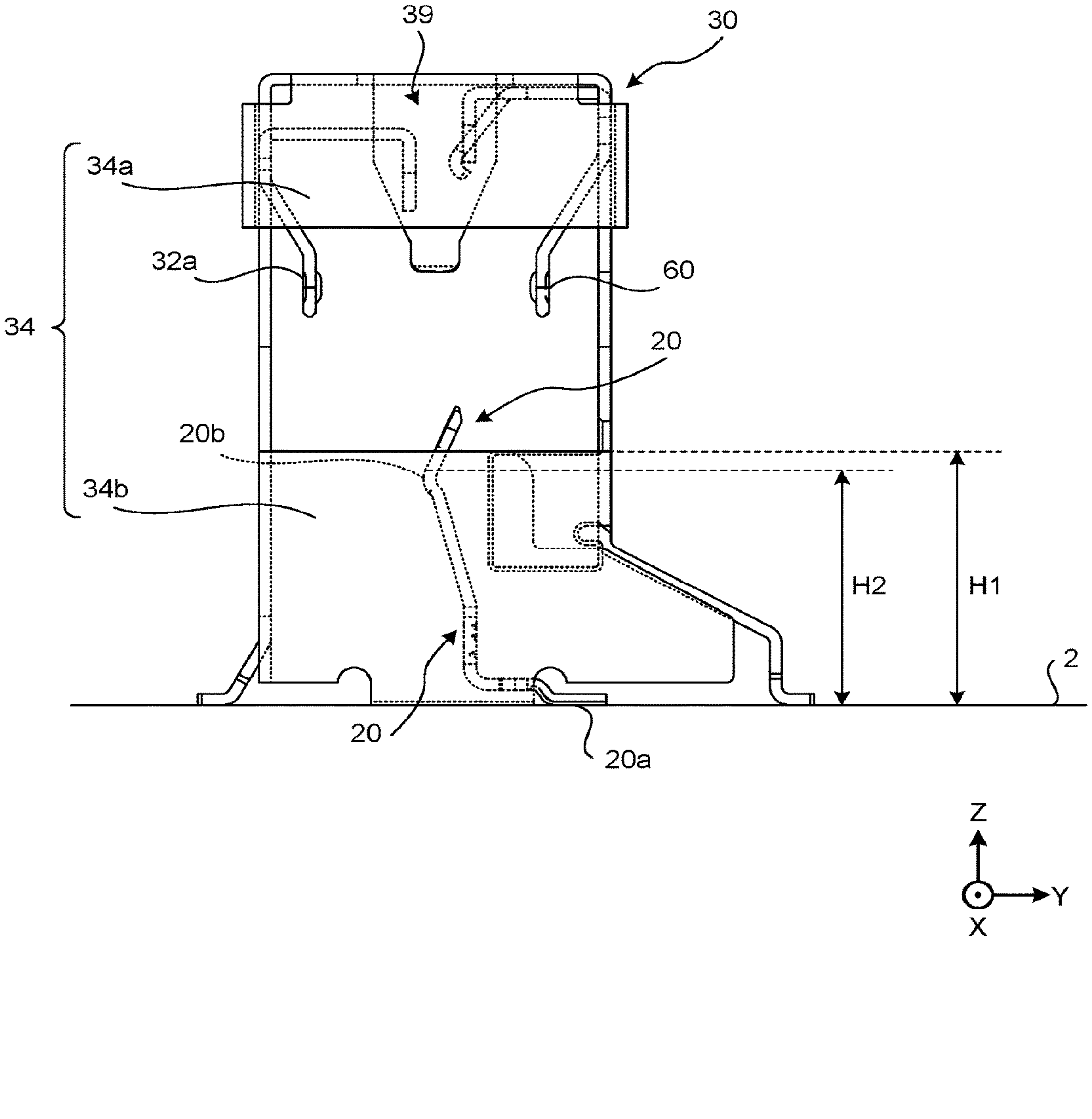
FIG. 16 is a diagram for explaining a relationship between a signal contact and a shell in an electrical connector according to an embodiment.
Figure 17:
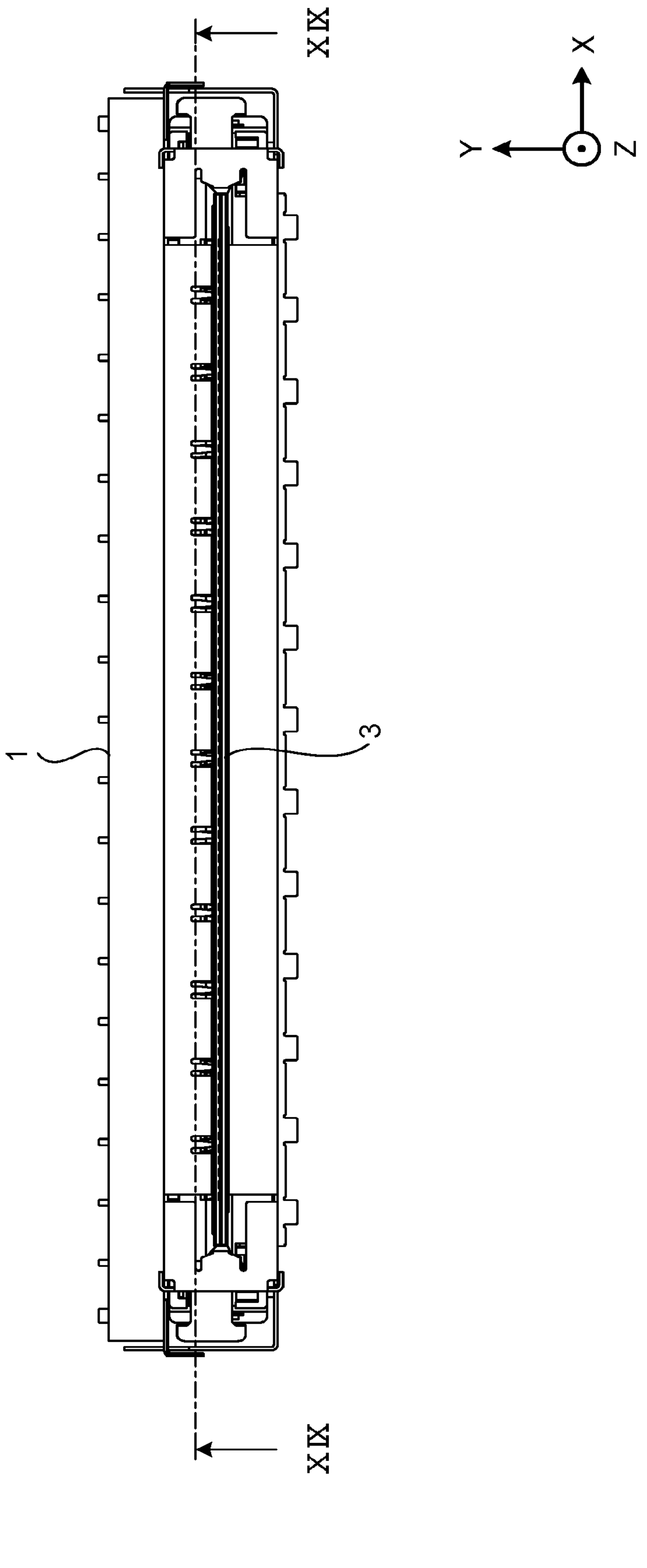
FIG. 17 is a plan view of an electrical connector in a state where a signal transmission medium according to an embodiment is connected thereto.
Figure 18:
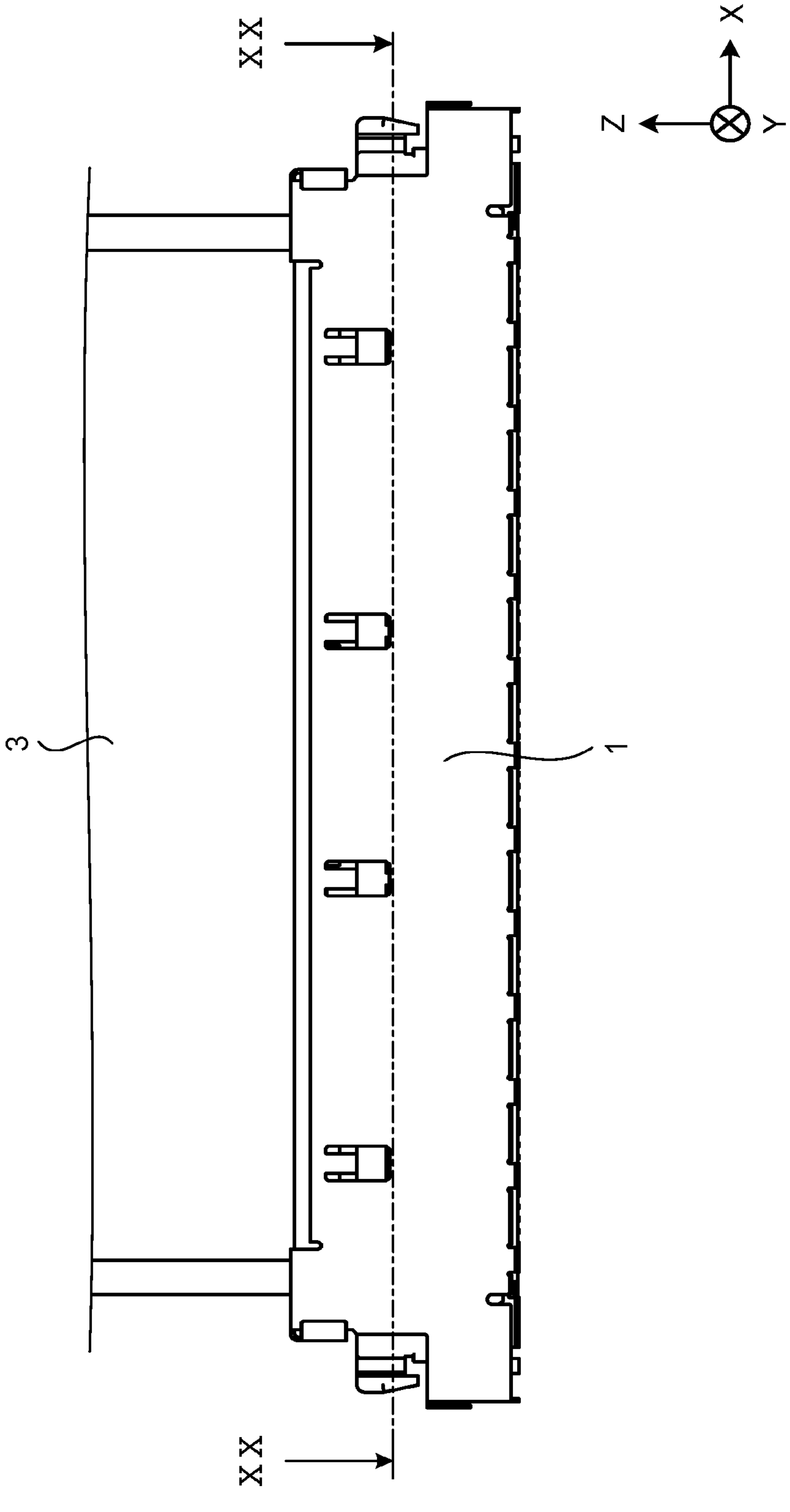
FIG. 18 is a back elevation view of an electrical connector in a state where a signal transmission medium according to an embodiment is connected thereto.

Furthermore, as illustrated in FIG. 16, a height H1 of the bottom cover part 34*b* of the side cover part 34 in the shell 30 from the wiring substrate 2 is greater than a height(s) H2 of the contact part(s) 20*b* of the signal contact(s) 20 that contact(s) the signal electrically conducting path(s) 91 of the non-illustrated signal transmission medium 3 that is inserted into the opening part 39. Furthermore, a height of the bottom cover part 33*b* of the side cover part 30 in the shell 30 from the wiring substrate 2 is also greater than a height(s) H2 of the contact part(s) 20*b* of the signal contact(s) 20 although illustration thereof is not provided. Current does not flow through a part(s) above the contact part(s) 20*b* of the signal contact(s) 20, so that it is possible for the side cover parts 33, 34 to well shield an electromagnetic wave(s) that is/are generated by a signal(s) that flow(s) through the signal contact(s) 20. Additionally, FIG. 16 does not illustrate the housing 10 for convenience of explanation.

3. Locking of State of Connection Between Electrical Connector 1 and Signal Transmission Medium 3 and Release of Locking Thereof Next, a configuration to lock a state of connection between an electrical connector 1 and a signal transmission medium 3 and to release locking between the electrical connector 1 and the signal transmission medium 3 by operations of operation parts 13*b*, 14*b* that are provided on a housing 10 will be explained specifically, with reference to FIG. 17 to FIG. 22.

Figure 20:
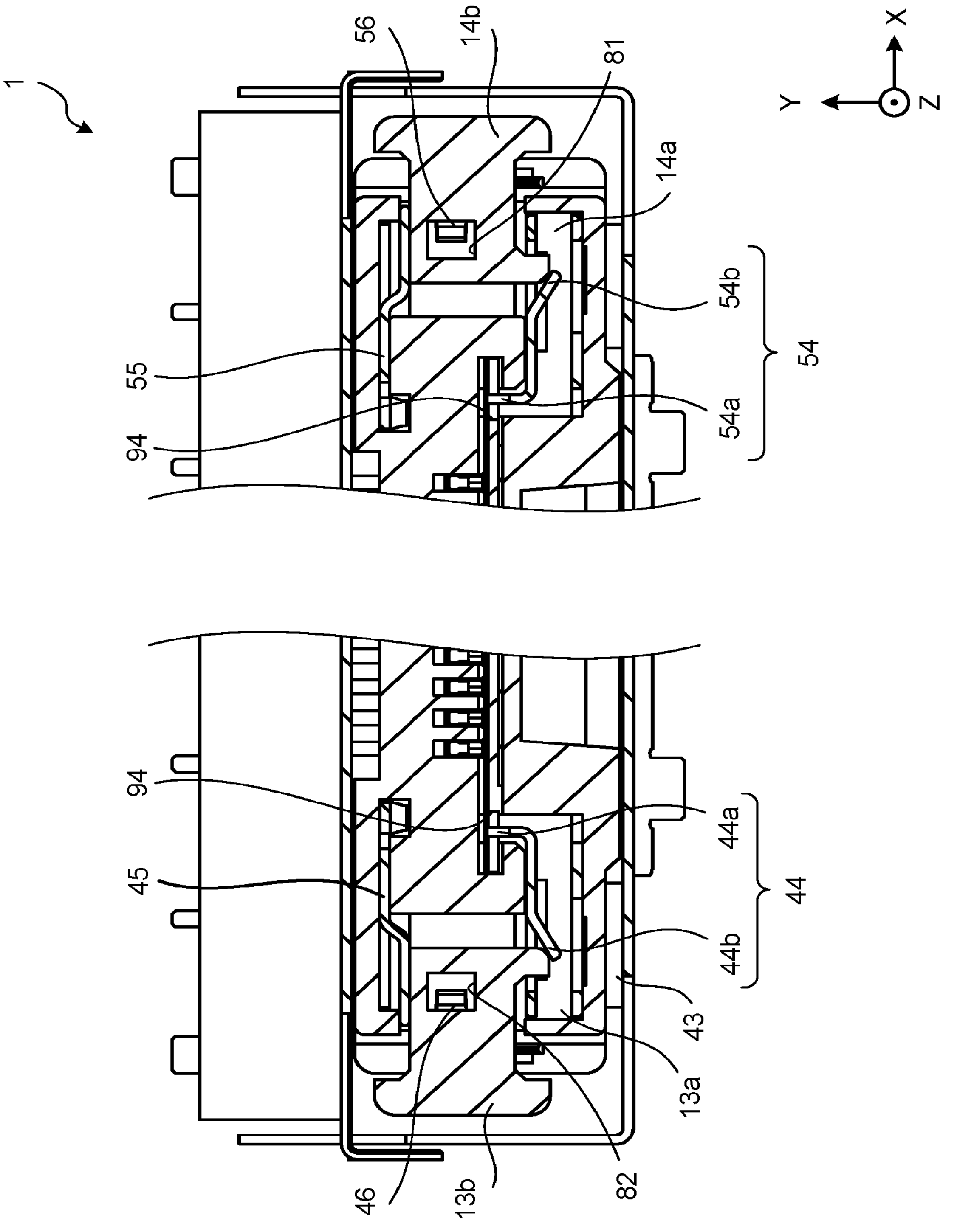
FIG. 20 is an arrow cross-sectional view along line XX-XX as illustrated in FIG. 18.

As illustrated in FIG. 20, in a state where the operation parts 13*b*, 14*b* are not operated so as to move in a direction toward the signal transmission medium 3 in leftward and rightward directions (directions of an X-axis), a locking part 44*a* is inserted into one of cut parts 94 of the signal transmission medium 3 and a locking part 54*a* is inserted into another of the cut parts 94 of the signal transmission medium 3. Hence, the signal transmission medium 3 is locked by fixing brackets 40, 50 that are fixed on the housing 10, so that the signal transmission medium 3 is locked by the electrical connector 1 in a state where it is connected to the electrical connector 1.

Figure 19:
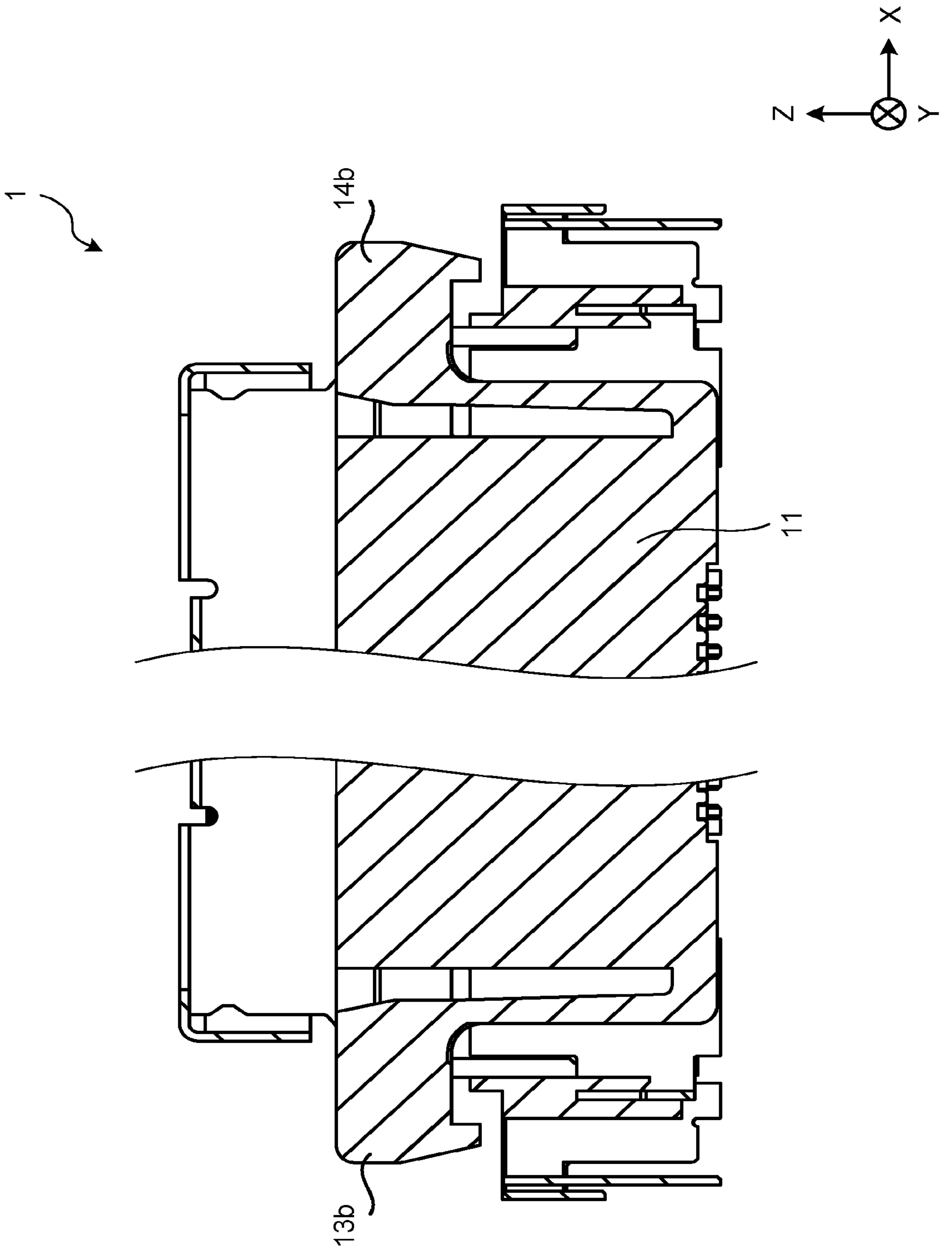
FIG. 19 is an arrow cross-sectional view along line XIX-XIX as illustrated in FIG. 17.
Figure 21:
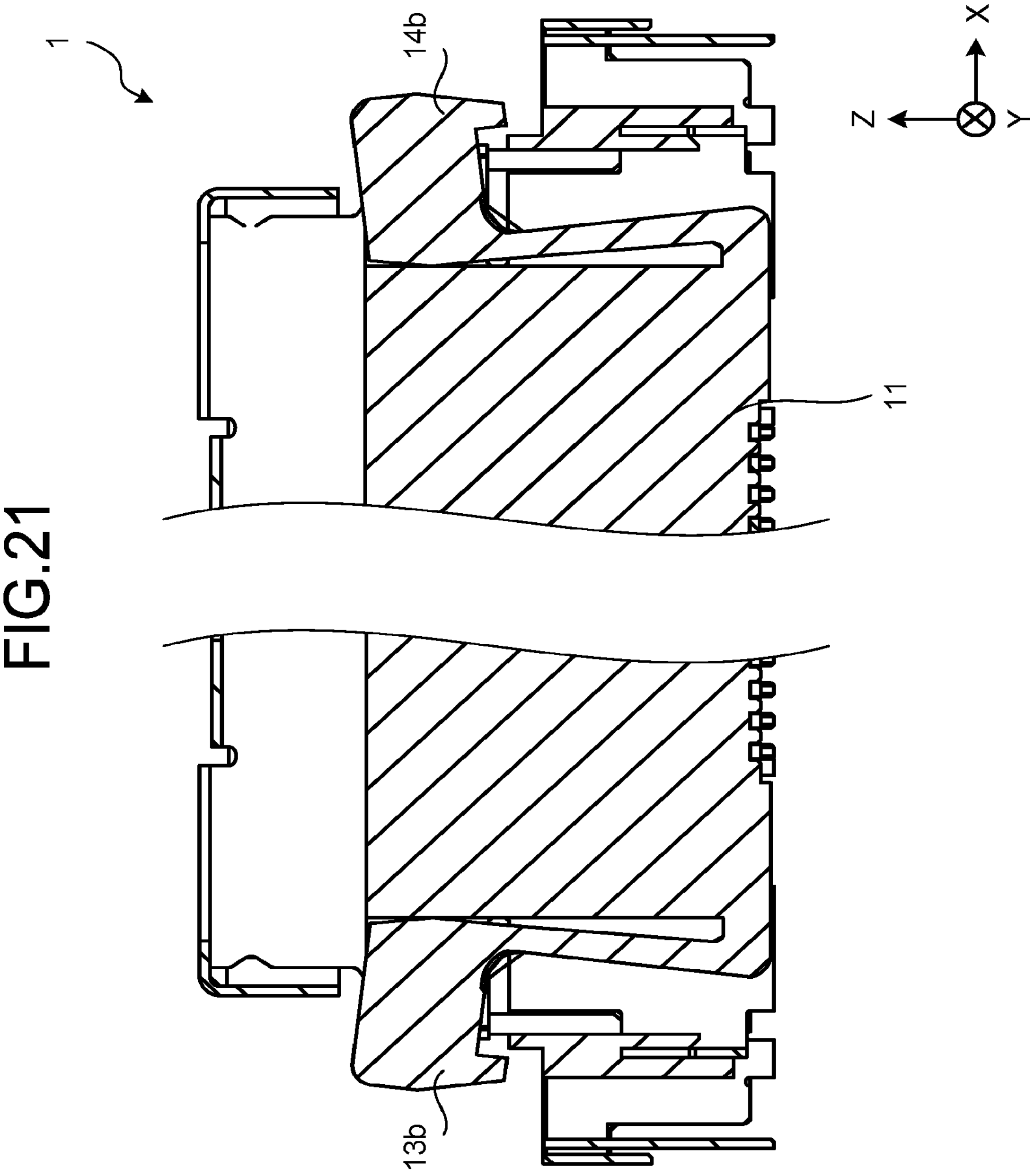
FIG. 21 is a corresponding arrow cross-sectional view along line XIX-XIX as illustrated in FIG. 17 in a case where an operation part is operated.
Figure 22:
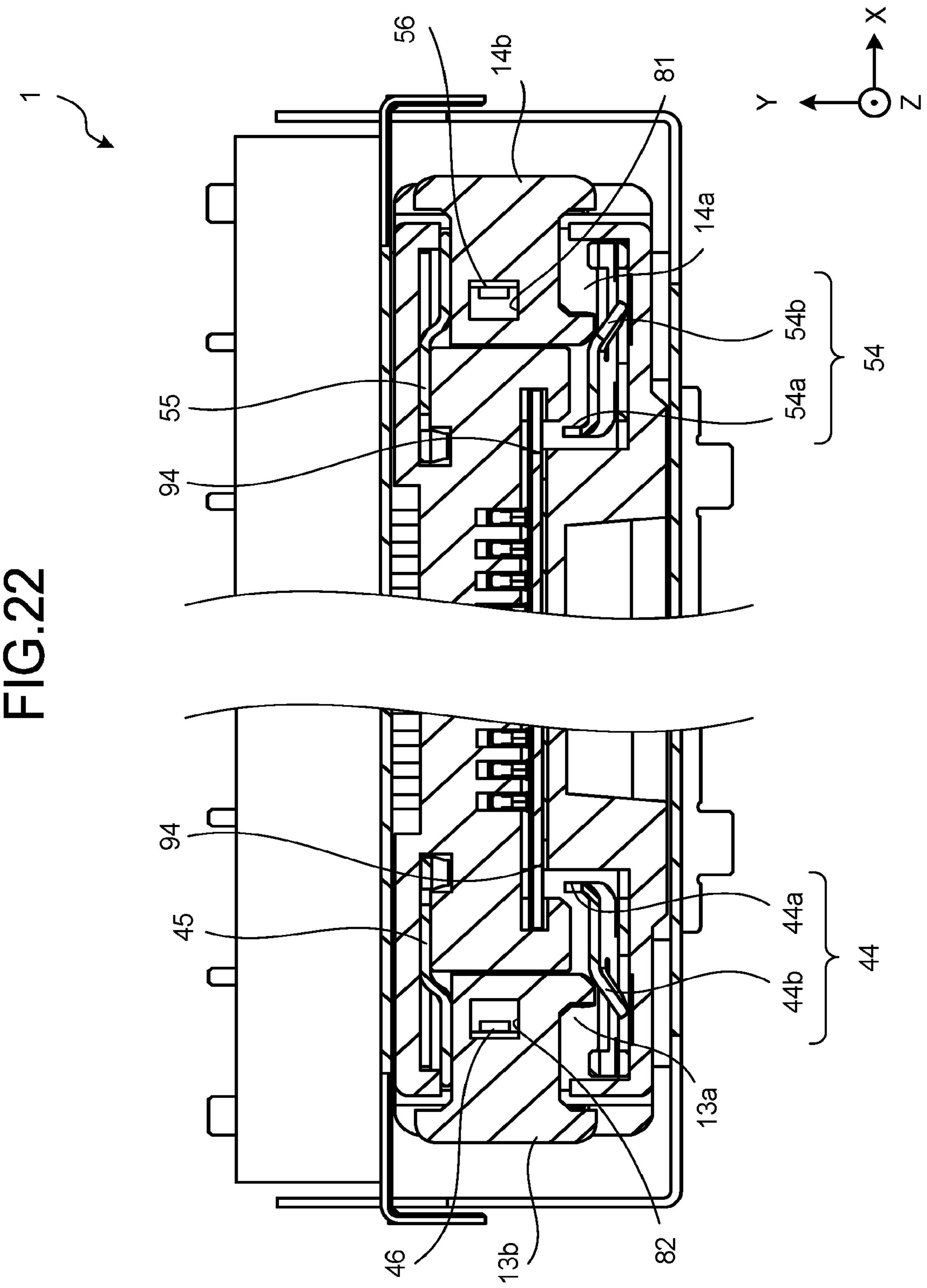
FIG. 22 is a corresponding arrow cross-sectional view along line XX-XX as illustrated in FIG. 18 in a case where an operation part is operated.

In a case where the operation parts 13*b*, 14*b* are operated so as to move in a direction toward the signal transmission medium 3 in leftward and rightward directions (directions of an X-axis) by an operator or the like from a state as illustrated in FIG. 19 and FIG. 20, the electrical connector 1 is provided in a state of FIG. 21 and FIG. 22. As an operation part 13*b* is operated, the operation part 13*b* pushes a protrusion part 44*b*, so that the locking part 44*a* is separated from one of the cut parts 94 of the signal transmission medium 3. Furthermore, as an operation part 14*b* is operated so as to move in a direction toward the signal transmission medium 3 in leftward and rightward directions (directions of an X-axis), the operation part 14*b* pushes a protrusion part 54*b*, so that the locking part 54*a* is separated from another of the cut parts 94 of the signal transmission medium 3. Thereby, a state of locking of the signal transmission medium 3 by the electrical connector 1 is released.

Additionally, as illustrated in FIG. 22, extension parts 46, 56 are inserted into attachment holes 81, 82 of the operation parts 13*b*, 14*b*. Hence, in a case where the operation parts 13*b*, 14*b* are not operated from a state of FIG. 21 and FIG. 22, the operation parts 13*b*, 14*b* return to positions as illustrated in FIG. 19 and FIG. 20.

Additionally, as illustrated in FIG. 9, the locking part 44*a* has a shape that is inclined downward. Furthermore, similarly, the locking part 54*a* also has a shape that is inclined downward. Hence, when the signal transmission medium 3 is inserted into the electrical connector 1, the locking parts 44*a*, 54*a* are pushed, and the cut parts 94 of the signal transmission medium 3 are inserted into the locking parts 44*a*, 54*a* in a case where they are provided at positions to face the locking parts 44*a*, 54*a*.

Furthermore, although the electrical connector 1 as described above is configured in such a manner that a direction where the signal transmission medium 3 is inserted is a downward direction, such a configuration is not limiting. It is sufficient that the electrical connector 1 is configured in such a manner that the signal transmission medium 3 is inserted from a direction that intersects with a principal surface M of the wiring substrate 2, and a configuration may be provided, for example, in such a manner that a direction where the signal transmission medium 3 is inserted is a frontward and obliquely downward direction or a backward and obliquely downward direction.

As described above, an electrical connector 1 according to an embodiment is an electrical connector that electrically connects a signal transmission medium 3 with a plate shape and a wiring substrate 2, and includes a plurality of signal contacts 20 with an electrically conductive property, a housing 10 with an insulation property, and a shell 30 with an electrically conductive property. The plurality of signal contacts 20 are arrayed along leftward and rightward directions (an example of a first direction) of the electrical connector 1, and electrically connect a corresponding signal electrically conducting path(s) 91 among a plurality of signal electrically conducting paths 91 that are provided on the signal transmission medium 3 to a corresponding signal electrically conducting path(s) among a plurality of signal electrically conducting paths (non-illustrated) that are provided on the wiring substrate 2, respectively. The housing 10 holds the plurality of signal contacts 20. The shell 30 has an opening part 39 where the signal transmission medium 3 is inserted thereto from a direction that intersects with a principal surface M of the wiring substrate 2, and electrically connects a ground electrical conducting path(s) 92, 93 that is/are provided on the signal transmission medium 3 to a ground electrically conducting path(s) (non-illustrated) that is/are provided on the wiring substrate 2. The shell 30 covers each of a plurality of outer surfaces 15*a*, 15*b*, 15*c*, 15*d*, 15*e* of the housing 10 that exclude an outer surface 15*f* that faces the principal surface M of the wiring substrate 2. Hence, it is possible for a shell 30 to execute electromagnetic shielding of a signal transmission path well. Furthermore, the shell 30 faces a connection part(s) 20*a* that is/are connected to the wiring substrate 2 on an outer surface 15*a* of the housing 10 and the plurality of signal contacts 20, with a gap(s) 85, in frontward and backward directions (an example of a second direction) that is/are a direction(s) along the principal surface M of the wiring substrate 2 and is/are orthogonal to the leftward and rightward directions. Hence, for example, it is possible to execute wiring in a region with a range that is indicated by a distance D1 as illustrated in FIG. 11. Furthermore, it is possible for a shell 30 to shield an electromagnetic wave(s) that is/are generated by a signal that flows through a wiring that is formed in a region with a range that is indicated by a distance D1. Therefore, it is possible to execute electromagnetic shielding of a signal transmission path better.

Furthermore, the shell 30 has a principal surface part 31*a* that covers a part of an outer surface 15*a* of the housing 10 that extends in the leftward and rightward directions, and an extension-out part 31*b* that extends out from the principal surface part 31*a* in a direction that is a frontward direction (an example of a second direction) and is away from the housing 10, and faces the connection part(s) 20*a* with a gap(s) 85 in the forward direction. Thereby, it is possible to prevent an electrical connector 1 from being wholly upsized as compared with a case where a principal surface part 31*a* in addition to an extension-out part 31*b* is configured to extend out from an outer surface 15*a* in a direction away from a housing 10.

Furthermore, the extension-our part 31*b* has a ground connection part 61 that is connected to the ground electrically conducting path (non-illustrated) that is provided on the wiring substrate 2. Thereby, it is possible to improve a shield effect of an extension-out part 31*b*.

Furthermore, the ground connection part 61 has a plurality of cut parts 61*b* that are arrayed at an interval(s) in the leftward and rightward directions, and the connection part(s) 20*a* of the plurality of signal contacts 20 is/are visible from a facing position(s) in the frontward and backward directions through the plurality of cut parts 61*b*. Thereby, after a wiring substrate 2 is attached to an electrical connector 1, it is possible to readily confirm connection between a non-illustrated ground electrically conducting path that is formed on the wiring substrate 2 and a connection part(s) 20*a*.

The shell 30 has a fixation part(s) 32*a*, 60 with one end that is fixed on the housing 10, and the fixation part(s) 32*a*, 60 has/have elasticity. Thereby, even in a case where a signal transmission medium 3 that is connected to an electrical connector 1 is tilted, it is possible to move a shell 30 so as to follow it. Hence, for example, it is possible to stabilize a state of contact of the shell 30 with a ground electrically conducting path(s) 92, 93.

Furthermore, the fixation part(s) 32*a*, 60 has/have elasticity in the forward and backward directions, and the shell 30 faces an outer surface(s) 15*a*, 15*b* of the housing 10 that extend(s) in the leftward and rightward directions with a gap(s) in the frontward and backward directions in a state where the one end(s) of the fixation part(s) 32*a*, 60 is/are fixed on the housing 10. Thereby, even in a case where a signal transmission medium 3 is tilted in frontward and backward directions, it is possible to move a shell 30 so as to follow it.

Furthermore, the shell 30 has a pair of side cover parts 33, 34 that face in the leftward and rightward directions through the housing 10, and such a pair of side cover parts 33, 34 has a part(s) that is/are higher than a height(s) H2 of a contact part(s) 20*b* that contact(s) the plurality of signal electrically conducting paths 91 on the plurality of signal contacts 20. Thereby, it is possible for a side cover part(s) 33, 34 to well shield an electromagnetic wave(s) that is/are generated by a signal(s) that flow(s) through a signal contact(s) 20. A pair of side cover parts 33, 34 is an example of a pair of members.

According to an aspect of an embodiment, it is possible to provide an electrical connector that is capable of executing electromagnetic shielding of a signal transmission path well.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:

1. An electrical connector that electrically connects a signal transmission medium with a plate shape and a wiring substrate, the electrical connector comprising:

a plurality of signal contacts with an electrically conductive property that are arrayed along a first direction of the electrical connector, and electrically connect a corresponding signal electrically conducting path(s) among a plurality of signal electrically conducting paths that are provided on the signal transmission medium to a corresponding signal electrically conducting path(s) among a plurality of signal electrically conducting paths that are provided on the wiring substrate, respectively;

a housing with an insulation property that holds the plurality of signal contacts; and a shell with an electrically conductive property that includes an opening part where the signal transmission medium is inserted thereto from a direction that intersects with a principal surface of the wiring substrate, and electrically connects a ground electrical conducting path that is provided on the signal transmission medium to a ground electrically conducting path that is provided on the wiring substrate, wherein the shell covers each of a plurality of outer surfaces of the housing that exclude a surface that faces the principal surface of the wiring substrate, and faces an outer surface of the housing and connection parts of the plurality of signal contacts that are connected to the wiring substrate, with a gap(s), in a second direction that is a direction along the principal surface of the wiring substrate and is orthogonal to the first direction, the shell includes a pair of folding parts that face each other through the opening part and are continuous with a pair of cover parts that cover a pair of outer surfaces that extend along the first direction and are positioned with a first gap in the second direction among the plurality of outer surfaces, the pair of folding parts include a first contact part and a second contact part that face each other with a second gap, the first contact part contacts a first ground electrical conducting path that is provided on one surface of the signal transmission medium, and the second contact part contacts a second ground electrical conducting path that is provided on another surface of the signal transmission medium.

2. The electrical connector according to claim 1, wherein the shell includes:

a principal surface part that covers a part of an outer surface of the housing that extends in the first direction; and an extension-out part that extends out from the principal surface part in a direction that is the second direction and is away from the housing, and faces the connection part(s) with a gap(s) in the second direction.

3. The electrical connector according to claim 2, wherein the extension-out part includes a ground connection part that is connected to the ground electrically conducting path that is provided on the wiring substrate.

4. The electrical connector according to claim 3, wherein:

the ground connection part includes a plurality of cut parts that are arrayed at an interval(s) in the first direction; and the connection part(s) of the plurality of signal contacts is/are visible from a facing position(s) in the second direction through the plurality of cut parts.

5. The electrical connector according to claim 1, wherein:

the shell includes a pair of members that face in the first direction through the housing; and the pair of members includes a part(s) that is/are higher than a contact part(s) that contact(s) the plurality of signal electrically conducting paths on the plurality of signal contacts.

* * * * *